(12) United States Patent
Voccio et al.

(10) Patent No.: US 10,078,529 B2
(45) Date of Patent: Sep. 18, 2018

(54) WAKE-ON-LAN AND INSTANTIATE-ON-LAN IN A CLOUD COMPUTING SYSTEM

(71) Applicant: Rackspace US, Inc., San Antonio, TX (US)

(72) Inventors: Paul Voccio, Windcrest, TX (US); Antony Joel Messerli, San Antonio, TX (US); Jason L. Mick, Converse, TX (US); Alexander Walsh, Halifax (CA)

(73) Assignee: Rackspace US, Inc., San Antonio, TX (US)

( * ) Notice: Subject to any disclaimer, the term of this patent is extended or adjusted under 35 U.S.C. 154(b) by 186 days.

(21) Appl. No.: 15/048,060

(22) Filed: Feb. 19, 2016

(65) Prior Publication Data

US 2016/0246639 A1 Aug. 25, 2016

Related U.S. Application Data

(63) Continuation of application No. 13/467,686, filed on May 9, 2012, now Pat. No. 9,268,586, which is a
(Continued)

(51) Int. Cl.
*G06F 9/455* (2018.01)
*G06F 3/06* (2006.01)
(Continued)

(52) U.S. Cl.
CPC .......... *G06F 9/45558* (2013.01); *G06F 3/065* (2013.01); *G06F 3/0626* (2013.01); *G06F 3/0665* (2013.01); *G06F 3/0689* (2013.01); *G06F 9/45533* (2013.01); *G06F 9/461* (2013.01); *G06F 9/4856* (2013.01); *G06F 11/14* (2013.01); *H04L 61/2007* (2013.01);
(Continued)

(58) Field of Classification Search
None
See application file for complete search history.

(56) References Cited

U.S. PATENT DOCUMENTS 6,032,044 A 2/2000 Shannon et al.
6,446,092 B1 8/2002 Sutter
(Continued)

FOREIGN PATENT DOCUMENTS

EP 2239866 A1 10/2010

OTHER PUBLICATIONS

International Search Report and Written Opinion issued for PCT/US2013/029274 dated Jun. 21, 2013, 12 pages.
(Continued)

*Primary Examiner* — Eric C Wai
(74) *Attorney, Agent, or Firm* — Haynes and Boone, LLP

(57) ABSTRACT

Several different embodiments of a flexible virtual machine management system are described. The virtual machine management system is used to instantiate, wake, move, sleep, and destroy individual operating environments in a cloud or cluster. In various embodiments, the virtual machine management system uses single messages to perform complex operations, allowing for flexible and scalable use of virtual resources in a cluster while still reducing energy consumption to the minimum possible level. In one preferred embodiment, Wake-on-LAN packets are used as the messages.

20 Claims, 15 Drawing Sheets

Related U.S. Application Data continuation of application No. 13/270,779, filed on Oct. 11, 2011, now Pat. No. 9,015,709, which is a continuation of application No. 13/270,737, filed on Oct. 11, 2011, now Pat. No. 9,552,215.

(60) Provisional application No. 61/479,294, filed on Apr. 26, 2011, provisional application No. 61/480,784, filed on Apr. 29, 2011, provisional application No. 61/450,166, filed on Mar. 8, 2011.

(51) Int. Cl.
    *G06F 9/48*     (2006.01)
    *G06F 9/46*     (2006.01)
    *G06F 11/14*     (2006.01)
    *H04L 29/12*     (2006.01)

(52) U.S. Cl.
CPC ...... *H04L 61/6022* (2013.01); *G06F 11/1484* (2013.01); *G06F 2003/0692* (2013.01); *G06F 2009/4557* (2013.01); *G06F 2009/45575* (2013.01); *G06F 2009/45595* (2013.01); *Y02B 60/144* (2013.01); *Y02B 60/162* (2013.01); *Y02D 10/24* (2018.01); *Y02D 10/32* (2018.01)

(56) References Cited

U.S. PATENT DOCUMENTS

| | | | |
|---|---|---|---|
| 6,795,966 | B1 | 9/2004 | Lim et al. |
| 6,917,963 | B1 | 7/2005 | Hipp et al. |
| 7,093,086 | B1 | 8/2006 | Van Rietschote |
| 7,577,722 | B1 | 8/2009 | Khandekar et al. |
| 7,634,430 | B2 | 12/2009 | Huberman et al. |
| 8,015,383 | B2 | 9/2011 | Shultz et al. |
| 8,364,639 | B1 | 1/2013 | Koryakina et al. |
| 8,438,216 | B2 | 5/2013 | Runcie et al. |
| 8,538,919 | B1 | 9/2013 | Neilsen et al. |
| 2005/0138310 | A1 | 6/2005 | Horiuchi |
| 2005/0268298 | A1 | 12/2005 | Hunt et al. |
| 2006/0005189 | A1 | 1/2006 | Vega et al. |
| 2006/0122927 | A1 | 6/2006 | Huberman et al. |
| 2007/0094467 | A1 | 4/2007 | Yamasaki |
| 2007/0226320 | A1 | 9/2007 | Hager et al. |
| 2008/0052322 | A1 | 5/2008 | Waldspurger |
| 2008/0222375 | A1 | 9/2008 | Kotsovinos et al. |
| 2009/0037680 | A1 | 2/2009 | Colbert et al. |
| 2009/0089781 | A1 | 4/2009 | Shingai et al. |
| 2009/0217072 | A1 | 8/2009 | Gebhart et al. |
| 2009/0228532 | A1 | 9/2009 | Anzai |
| 2009/0241113 | A1 | 9/2009 | Sequin et al. |
| 2009/0313445 | A1 | 12/2009 | Pandey et al. |
| 2010/0082922 | A1 | 4/2010 | George et al. |
| 2010/0094948 | A1 | 4/2010 | Ganesh et al. |
| 2010/0103781 | A1 | 4/2010 | Rai et al. |
| 2010/0122248 | A1 | 5/2010 | Robinson et al. |
| 2010/0131649 | A1 | 5/2010 | Ferris |
| 2010/0217866 | A1 | 8/2010 | Nandagopal et al. |
| 2010/0306354 | A1 | 12/2010 | DeHaan et al. |
| 2011/0099267 | A1 | 4/2011 | Suri et al. |
| 2011/0153697 | A1 | 6/2011 | Nickolov et al. |
| 2012/0054306 | A1 | 3/2012 | Vaghani et al. |
| 2012/0084381 | A1 | 4/2012 | Alladi et al. |
| 2012/0272244 | A1 | 10/2012 | Bozek et al. |

OTHER PUBLICATIONS

Llorente et al., "Cloud Computing for on-Demand Grid Resource Provisioning," High Speed and Large Scale Scientific Computing, IOS Press Jan. 1, 2009, pp. 177-191.

Crago et al., "Heterogeneous Cloud Computing Platforms," 2011 IEEE International Conference on Cluster Computing, Sep. 26, 2011, pp. 378-385.

Cordeiro et al., "Open Source Cloud Computing Platforms," 2010 Ninth International Conference on Grid and Cloud Computing, Nov. 1, 2010, pp. 366-371.

European Search Report received in European Application No. 12001564.9, dated Nov. 28, 2012, 5 pages.

Malone, Thomas W., et al. "Enterprise: A Market-Like Task Scheduler for Distributed Computing Environments," Oct. 1983, CISR WP#111, Sloan WP #1537-84, Cambridge, MA, 46 pages.

Miller, Mark S., et al., "Markets and Computation: Agoric Open Systems," The Ecology of Computation (Huberman, ed.) Elsevier Science Publishers/North-Holland, 1988, 38 pages.

Kurose, James F. et al, "A Microeconomic Approach to Optimal Resource Allocation in Distributed Computer Systems", IEEE Transactions on Computers, May 1989, p. 705-717, vol. 38 No. 5.

Waldspurger, Carl A., "Spawn: A Distributed Computational Economy", IEEE Transactions on Software Engineering, Feb. 1992, p. 103-117, vol. 18 No. 2.

Stober, Jochen et al, "Market-Based Pricing in Grids: On Strategic Manipulation and Computational Cost," Karlsruhe Institute of Technology, Universitat Karlsruhe and Albert-Ludwigs-Universitat Freiberg, Germany, 2010, 31 pages.

Niyato, Dusit, et al, "Cooperative Virtual Machine Management for Multi-Organization Cloud Computing Environment," Nanyang Technological University, Singapore, 2011, p. 528-537.

Zhou, Songnian, et al, "Utopia: A Load Sharing Facility for Large, Heterogeneous Distributed Computer Systems," Technical Report CSRI-257, Apr. 1992, Toronto, Canada, 37 pages.

Wang, Tengjiao, et al, "MBA: A Market-based Approach to Date Allocation and Dynamic Migration for Cloud Database," Science China, Jan. 2010, vol. 53, No. 1: 1-18.

Miller, Mark S., et al, "Comparative Ecology: A Computational Perspective," *The Ecology of Computation* (Huberman, ed.), Elsevier Science Publishers/North-Holland, 1988, 34 pages.

Wellman, Michael P., "A Market-Oriented Programming Environment and Its Application to Distributed Multicommodity Flow Problems," Journal of Artificial Intelligence Research 1, Aug. 1993, p. 1-23.

Stonebraker, Michael, et al, "An Economic Paradigm for Query Processing and data Migration in Mariposa," University of California, Berkeley 1994, 10 pages.

Messer, Alan, et al, "A Market Model for Resource Allocation in Distributed Operating Systems," Systems Architecture Research Center, London, UK, 1995, 12 pages.

Cliff, Dave, "Minimal-Intelligence Agents for Bargaining Behaviors in Market-Based Environments," University of Sussex, Brighton, UK, Jun. 1997, 134 pages.

Chun, Brent N., et al, "Market-based Proportional Resources Sharing for Clusters," University of California, Berkeley, 1999, 19 pages.

Wolski, Rich, et al, "Analyzing Market-based Resource Allocation Strategies for the Computational Grid," University of Tennessee and College of the Holy Cross, Knoxville, 2001, 26 pages.

Chun, Brent Nee, "Market-based Cluster Resource Management," dissertation for Ph.D. requirements, University of California, Berkeley, Fall 2001, 191 pages.

He, Linli, et al, "Forming Resource-Sharing Coalitions: a Distributed Resource Allocation Mechanism for Self-Interested Agents in Computational Grids," ACM Symposium on Applied Computing, Mar. 13-17, 2005, Santa Fe, NM, 1-58113-964-0-05-0003, p. 84-91.

Buyya, Rajkumar, et al, "Market-Oriented Cloud Computing: Vision, Hype, and Reality for Delivering IT Services as Computing Utilities," GRIDS Laboratory, University of Melbourne, Australia, 2008, 9 pages.

Lai, Kevin, et al, "Tycoon: A Distributed Market-based Resource Allocation System," HP Labs, Feb. 1, 2008, arXiv:cs/0404013v1 [cs.DC], Apr. 5, 2004, 8 pages.

An, Bo, et al, "Automated Negotiation with Decommitment for Dynamic Resource Allocation in Cloud Computing," May 2010, University of Massachusetts, Amherst, p. 981-988.

Clark et al, "Live Migration of Virtual Machine," USENIX Association, NSDI'05: 2$^{nd}$ Symposium on Networked Systems Design & Implementation, May 2005, p. 273-286.

(56) References Cited

OTHER PUBLICATIONS

International Search Report and Written Opinion issued for PCT/US2014/012514 dated Jun. 4, 2014, 12 pages.
Miller, Mark S., et al., "Incentive Engineering: for Computational Resource Management," The Ecology of Computation (Huberman, ed.), Elsevier Science Publishers/North Holland, 1988 46 pages.

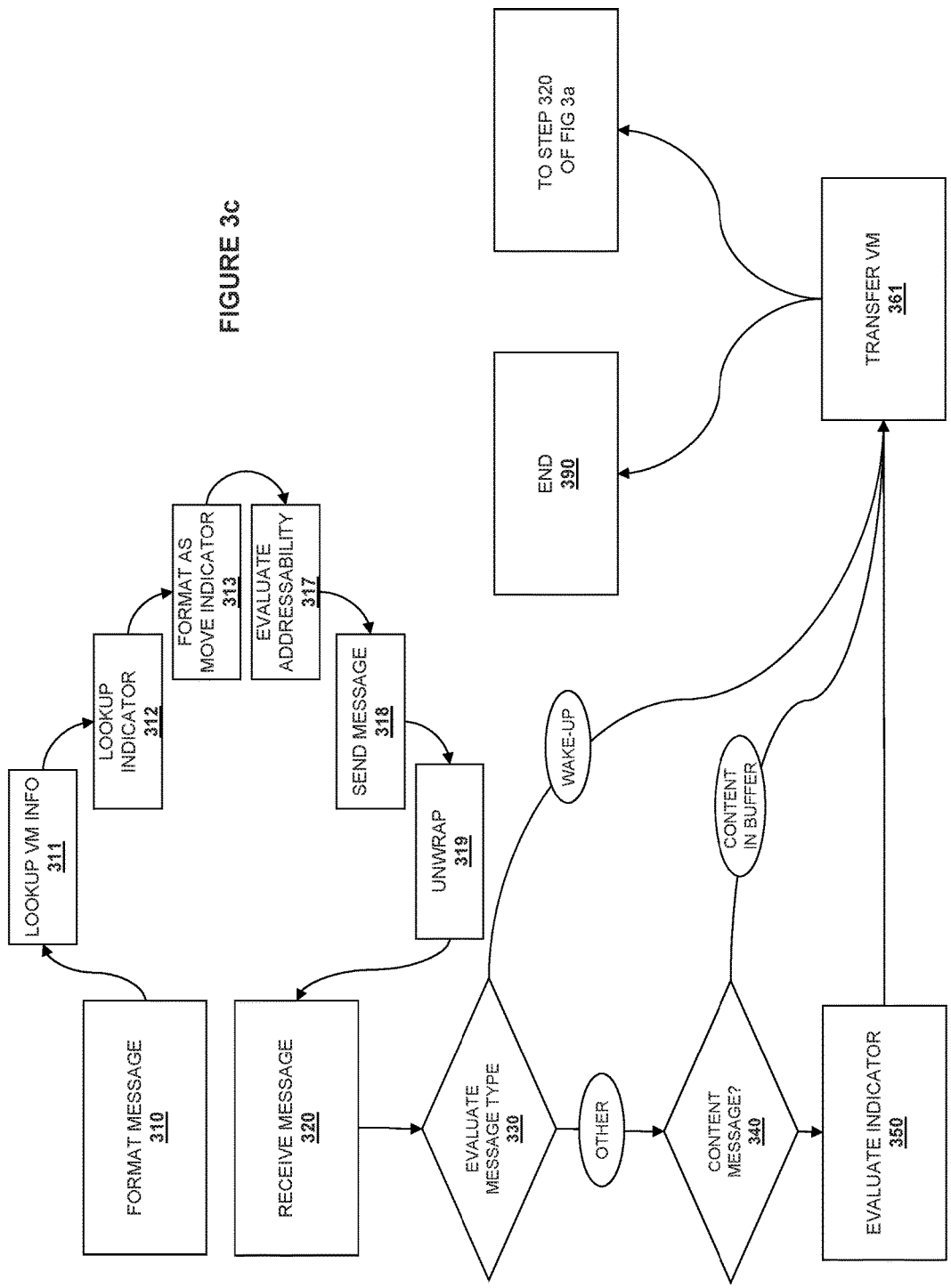

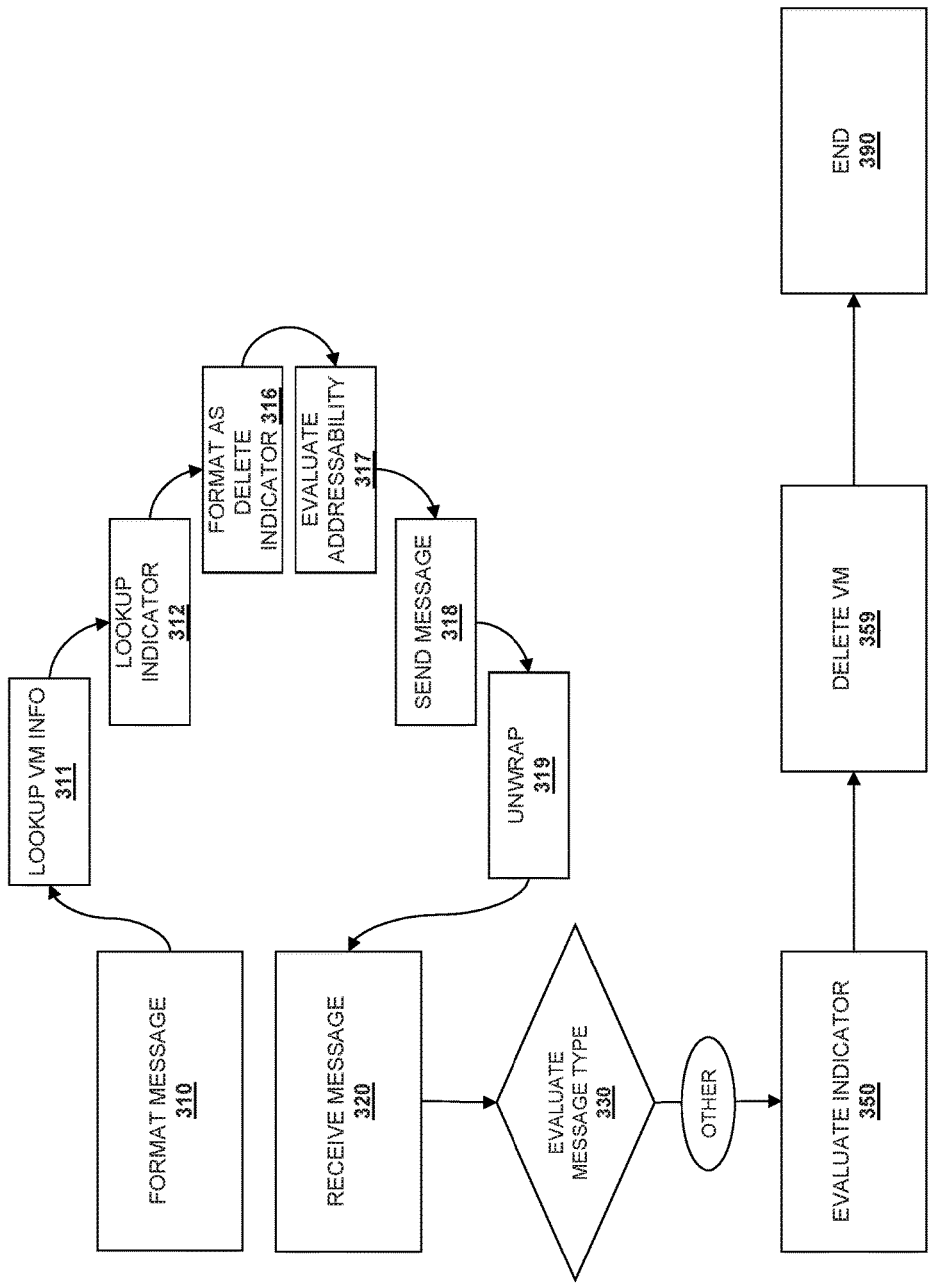

ations Ser. No. 13/467,686, filed May 9, 2012 which claims
WAKE-ON-LAN AND INSTANTIATE-ON-LAN IN A CLOUD COMPUTING SYSTEM

CROSS REFERENCE

This is a continuation application of U.S. patent application Ser. No. 13/467,686, filed May 9, 2012 which claims priority to U.S. provisional patent applications 61/450,166, filed Mar. 8, 2011, 61/480,784, filed Apr. 29, 2011, and 61/479,294, filed Apr. 26, 2011, and is a continuation of U.S. non-provisional applications Ser. No. 13/270737, filed Oct. 11, 2011, and Ser. No. 13/270779, filed Oct. 11, 2011. The entirety of these disclosures is hereby incorporated herein by reference.

BACKGROUND

The present disclosure relates generally to cloud computing, specifically relative to the ability to dynamically adjust computational and storage capacity on demand. The compute capacity can be increased or decreased by adjusting the number of processing units (cores) allocated to a given instance of a processing module (server or node) or by adjusting the overall quantity of processing modules in a system. Cloud computing systems such as OpenStack abstract the management layer of a cloud and allow clients to implement hypervisor agnostic processing modules.

One core technology underlying cloud computing is virtualization. Virtualization enables a single physical machine to run multiple operating systems or operating environments at once. This allows the consolidation of workloads when there is less load, but also the ability to subdivide physical machines, creating additional virtual resources on demand. These additional virtual resources can be configured to have a high degree of uniformity, making the addition of newly-created virtual resources easier to integrate into an existing system.

Another existing technology is called "Wake on Lan" or "WoL." WoL allows a networked computer to go into a lower power state when it is not being used, while also allowing external management software to wake up the computer by sending an Ethernet frame with a specific structure, called a "Magic Packet." The Ethernet controller then alerts the system and the power management circuitry wakes it up.

Virtualization allows the migration of computing resources from one host machine to another host machine. Existing techniques typically require the use of shared storage to be able to transfer a virtual machine from one server to the other while it's still running. Shared storage can be inefficient because it can be challenging and expensive to scale in cloud provider environments and may present a single point of failure. Other techniques require the virtual machine to be shut down during the entire period of transfer from one server to another. If the virtual machine happens to be very large in size, the transfer time could take very long periods of time to transfer it from one server to another.

Similarly, Wake-on-LAN allows virtual machines to be awakened under certain circumstances, but the virtual machines must be pre-defined and the use of certain sleep states is less efficient.

It is accordingly desirable to improve virtual machine management, including the processes for waking, migrating, and configuring virtual machines in a cloud computing system.

SUMMARY

In one embodiment, there is provided a system and method for remotely managing an operating environment including an information processing device, wherein the information processing device has an associated hypervisor and network connection. The method comprises receiving a message at the hypervisor via the network connection and determining which operating environment managed by the hypervisor is addressed by the message. In some cases, the addressed operating environment may not yet exist. The hypervisor identifies the type of message and interacts with the addressed operating environment according to the message. Interacting with the addressed operating environment may include creating a new operating environment, waking an existing operating environment, changing or moving an existing operating environment, sleeping an existing operating environment, and destroying an existing operating environment.

In another embodiment, the system and method allows the movement of a virtual machine with minimal downtime without the use of an expensive shared storage device. It allows for the virtual machine to be moved in either a suspended or shutdown state while being on-line for most of the transfer. In the suspended state, the virtual machine and its memory state are moved to another machine and on resuming of the virtual machine, the virtual machine appears to have never been powered off to the user except for a brief period of network loss.

In another embodiment, there is a method for configuring a virtual machine. There are two storage mechanisms available to the virtual machine: a first storage containing virtual machine operating information, and a second storage including virtual machine configuration information. The configuration information in the second storage is used to configure the virtual machine, including changing the information in the operating storage. The configuration information can pertain to the hypervisor, any logical container within the hypervisor, and any operating environment within one of the logical containers.

In a further embodiment, the configuration information from the second storage can be saved and provided to another virtual machine, and used to configure the second virtual machine in a similar fashion. Each virtual machine can have an independent copy of the second storage, or the storage can be mounted in the first machine, unmounted, and then mounted in the second machine.

In another embodiment, there is a method and system for transferring an operating environment from a first host to a second host. The first host contains an active environment, with a disk and memory. The disk is snapshotted while the operating environment on the first host is still live, and the snapshot is transferred to the second host. After the initial snapshot is transferred, a differential update using rsync or a similar mechanism can be used to transfer just the changes from the snapshot from the first to the second host.

In a further embodiment, the contents of the memory are also transferred. This memory can be transferred as a snapshot after pausing the active environment, or by synchronizing the memory spaces between the two hosts.

The specifics of these embodiments as well as other embodiments are described with particularity below.

BRIEF DESCRIPTION OF THE DRAWINGS

FIG. 3*c* is a flow chart illustrating an embodiment of a method for waking and moving a virtual machine using a message.

FIG. 3*f* is a flow chart illustrating an embodiment of a method for destroying a virtual machine using a message.

DETAILED DESCRIPTION

Figure 1:
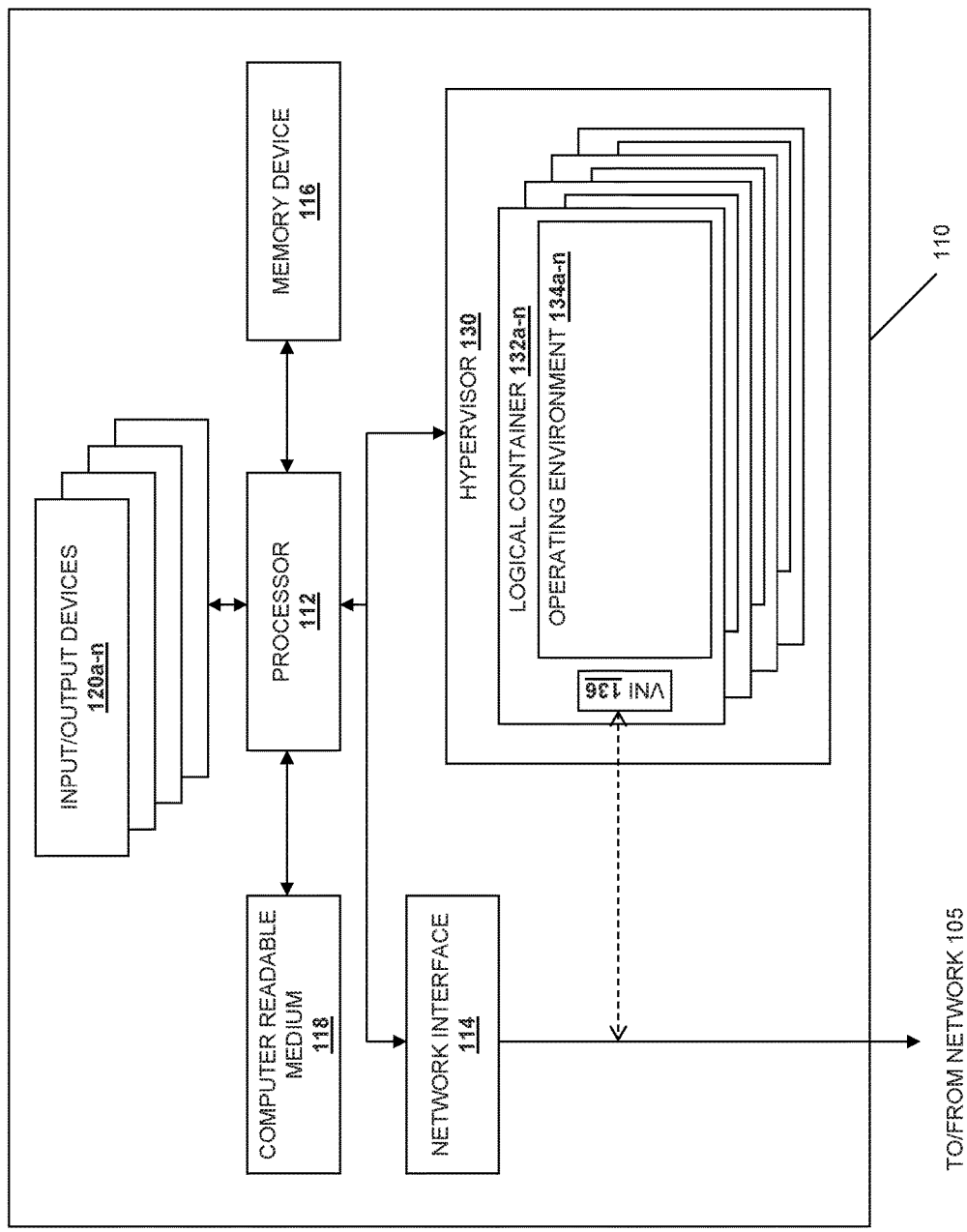
FIG. 1 is a schematic view illustrating an embodiment of an information processing system.

In one embodiment, a system and method for dynamically instantiating a virtual machine (VM) in a cloud computing environment in response to a message is described. Although the message will be described in terms of a Wake-on-LAN message, various other types of messages are contemplated, including wake on PHY activity, wake on a unicast message, wake on a multicast message, wake on a broadcast message, wake on ARP, and wake on ICMP (such as wake on ping). In other embodiments, there may be one or more fully active operating systems listening on an associated physical machine that have a full network stack and processing capability; in those cases, the wake/instantiate message can be at a higher level in the stack, such as an HTTP request, XMLRPC request, SOAP, CORBA, AMQP or ZeroMQ message, or any other protocol known in the art. The description of a message as a Wake-on-LAN (or "WoL") packet or a "magic packet" is simply one embodiment used for clarity and ease of description.

Various types of messages are contemplated. In one embodiment, a message is a "wakeup-only message," and no further processing is needed. In a second embodiment, a message is an "indicator message," contains or is sent in a manner that indicates some kind non-overt semantic message. A third embodiment is a "content message," and contains content to be received or processed. It is anticipated that all three types of messages will be used.

Wake-on-LAN is implemented using a specially formatted data-link layer packet (the "magic packet") containing the MAC address of a destination computer. The listening computer waits for a magic packet addressed to it and then initiates system wake-up.

More specifically, the magic packet is a broadcast frame containing anywhere within its payload 6 bytes of all 255 (FF:FF:FF:FF:FF:FF in hexadecimal), followed by sixteen repetitions of the target computer's 48-bit MAC address. Typically, network cards include logic to scan for the magic packet. The packet may be sent as any network- and transport-layer protocol, although it is typically sent as a UDP datagram to port 7 or 9, or directly over Ethernet as EtherType 0x0842. It is anticipated that different ports, protocols, and/or EtherTypes can be used to distinguish different types of messages, including, but not limited to wakeup-only and indicator messages. A content message will typically be sent in the correct protocol associated with the content to be received and/or processed.

As typically implemented, a magic packet requires that the destination computer MAC address be known, as it needs to be included in the packet. Further, magic packets do not provide delivery confirmation, and are generally subnet-local, unless a subnet-directed broadcast is used.

Virtual machines that emulate hardware typically use the states defined by ACPI-based power management. The ACPI specification defines the following seven whole-system "global" states for an ACPI-compliant computer-system:

G0 (S0): Working

G1, or Sleeping, subdivided into the four states S1 through S4:
   S1: All processor caches are flushed, and the CPU(s) stop executing instructions. Power to the CPU(s) and RAM is maintained; devices that do not indicate they must remain on may be powered down.
   S2: CPU powered off
   S3: Commonly referred to as Standby, Sleep, or Suspend to RAM. RAM remains powered.
   S4: Hibernation or Suspend to Disk. All content of main memory is saved to non-volatile memory such as a hard drive, and is powered down.

G2 (S5), Soft Off: Most systems are powered down, but some components remain powered so the computer can "wake" from input from the keyboard, clock, modem, LAN, or USB device.

G3, Mechanical Off: The computer's power consumption approaches close to zero, to the point that the power cord can be removed and the system is safe for disassembly (typically, only the real-time clock is running off its own small battery).

Wake-on-LAN support in a virtual machine typically focuses on states S1-S4 and S5. In states S1-S4, the VM must still be resident in memory, just "sleeping." This uses resources which could be consumed by other VMs—including RAM usage and power draw, including about 60% of the power draw associated with a fully-on but idle VM. A VM in state S5 is written out to disk and requires rebooting of the operating system.

In the context of the ACPI specification, one embodiment defines a new state G4, meaning that the VM does not yet exist it is either just a disk image ready to be instantiated, or even a series of instructions or a template image. On reception of the magic packet by the hypervisor, the system "wakes" the VM either by rousing it out of memory (relative to states S1-S4), booting it from an already-created disk image (relative to state S5), by instantiating a VM from an existing disk image, or by following the instructions or template to create a new VM (corresponding to state G4). This will also be referred to as "Instantiate-on-LAN," or "IoL."

In a further embodiment, networks of VMs are defined, either fully laid out or as templates, and then not created or turned off. The VMs have a "waking order" so that the network equipment can auto-scale as traffic goes up and down.

In one embodiment, IoL can be combined with traditional WoL so that an entire physical box as well as associated VMs can be "woken" with one packet. The "live" NIC can be in the physical box that houses the hypervisor. If there are no live VMs on the box, the entire physical box can be put to sleep, resulting in power savings. The NIC can listen for the magic packet addressed to its own address or to one of the VM addresses registered with the hypervisor. Upon awakening, the hypervisor can execute pre-provided instructions to automatically instantiate the correct VM.

Similarly, messages such as those described above can be used in the manner described to send more general administrative messages about various virtual machines, including instructions to transfer, or configure a virtual machine.

Existing systems typically transfer the disk images associated with a VM in a G2 or G3 state. A VM in state S5 is written out to disk and requires rebooting of the operating system. The systems and methods described below allow a VM to be moved in S3, S4, or S5 state while being on-line for most of the transfer. In the suspended state, the virtual machine and its memory state are moved to another machine and on resuming of the virtual machine, the virtual machine appears to have never been powered off to the user except for a brief period of network loss. Because of the nature of the virtual machine environment, it is possible to snapshot a running VM, including memory state, without the cooperation of the underlying operating system. Further, the transferred VM will still appear to have the identical hardware, MAC address, IP address, and other underlying information as at the previous host, allowing the experience from a VM perspective as well as a user perspective to only be one of a brief loss of network connectivity.

Finally, various hypervisors use different methods of providing their functionality. When instantiating or transferring a VM, there may be differences in the underlying hypervisor that need to be taken into account. Accordingly, hypervisor agnostic methods to persist and backup virtual machine configurations will be described. The methods are suitable for use with any virtualization product that uses configurations where a user desires to customize the virtualization product and pass the customized virtualization product across a cloud and/or hypervisors. In some aspects, the methods are suitable for configuring a virtual machine that does not have network connectivity or any back channel method of reaching into the virtual machine. The methods allow the customized virtualization product to be portable across hypervisors and without vendor lock-in. The methods also do not require the hypervisor to be able to read and write to a guest's file system. Accordingly, even where the guest's file system is encrypted, unknown, or otherwise unavailable, the methods of the present disclosure still allow the virtualization product to be properly configured. In that regard, the methods allow a user to pass pre-configuration data related to the virtualization product and enable the portability of this pre-configuration data outside of the datacenter and cloud providers. By doing so, the methods lessen the reliance on a single hypervisor vendor and do not rely on network access to reach a metadata service on the network. Accordingly, a potential vector of attack is avoided.

Specifics of these and other embodiments will be discussed below with reference to the provided figures.

FIG. 1 shows an information processing system 110 configured to host one or more virtual machines. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 110 shown is representative of, one of, or a portion of, the information processing systems described above.

The information processing system 110 may include any or all of the following: (a) a processor 112 for executing and otherwise processing instructions, (b) a network interface 114 (e.g., circuitry) for communicating between the processor 112 and other devices, those other devices possibly located across the network 105; (C) a memory device 116 (e.g., FLASH memory, a random access memory (RAM) device or a read-only memory (ROM) device for storing information (e.g., instructions executed by processor 112 and data operated upon by processor 112 in response to such instructions)). In some embodiments, the information processing system 110 may also include a separate computer-readable medium 118 operably coupled to the processor 112 for storing information and instructions as described further below.

In some embodiments, the information processing system 110 may include a plurality of input/output devices 120a-n which are operably coupled to the processor 112, for inputting or outputting information, such as a display device 120a, a print device 120b, or other electronic circuitry 120c-n for performing other operations of the information processing system 110 known in the art.

With reference to the computer-readable media, including both memory device 116 and secondary computer-readable medium 118, the computer-readable media and the processor 112 are structurally and functionally interrelated with one another as described below in further detail, and the information processing system of the illustrative embodiment is structurally and functionally interrelated with a respective computer-readable medium similar to the manner in which the processor 112 is structurally and functionally interrelated with the computer-readable media 116 and 118. As discussed above, the computer-readable media may be implemented using a hard disk drive, a memory device, and/or a variety of other computer-readable media known in the art, and when including functional descriptive material, data structures are created that define structural and functional interrelationships between such data structures and the computer-readable media (and other aspects of the system 100). Such interrelationships permit the data structures' functionality to be realized. For example, in one embodiment the processor 112 reads (e.g., accesses or copies) such functional descriptive material from the network interface 114, the computer-readable media 118 onto the memory device 116 of the information processing system 110, and the information processing system 110 (more particularly, the processor 112) performs its operations, as described elsewhere herein, in response to such material stored in the memory device of the information processing system 110. In addition to reading such functional descriptive material from the computer-readable medium 118, the processor 112 is capable of reading such functional descriptive material from (or through) the network 105. In one embodiment, the information processing system 110 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 110, without limiting them to a specific location or implementation.

The information processing system 110 includes a hypervisor 130. The hypervisor 130 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 118. The hypervisor may be included logically "below" a host operating system, as a host itself, as part of a larger host operating system, or as a program or process running "above" or "on top of" a host operating system. Examples of hypervisors include Xenserver, KVM, VMware, Microsoft's Hyper-V, and emulation programs such as QEMU.

The hypervisor 130 includes the functionality to add, remove, and modify a number of logical containers 132*a-n* associated with the hypervisor. Zero, one, or many of the logical containers 132*a-n* contain associated operating environments 134*a-n*. The logical containers 132*a-n* can implement various interfaces depending upon the desired characteristics of the operating environment. In one embodiment, a logical container 132 implements a hardware-like interface, such that the associated operating environment 134 appears to be running on or within an information processing system such as the information processing system 110. For example, one embodiment of a logical container 134 could implement an interface resembling an x86, x86-64, ARM, or other computer instruction set with appropriate RAM, busses, disks, and network devices. A corresponding operating environment 134 for this embodiment could be an operating system such as Microsoft Windows, Linux, Linux-Android, or Mac OS X. In another embodiment, a logical container 132 implements an operating system-like interface, such that the associated operating environment 134 appears to be running on or within an operating system. For example one embodiment of this type of logical container 132 could appear to be a Microsoft Windows, Linux, or Mac OS X operating system. Another possible operating system includes an Android operating system, which includes significant runtime functionality on top of a lower-level kernel. A corresponding operating environment 134 could enforce separation between users and processes such that each process or group of processes appeared to have sole access to the resources of the operating system. In a third environment, a logical container 132 implements a software-defined interface, such a language runtime or logical process that the associated operating environment 134 can use to run and interact with its environment. For example one embodiment of this type of logical container 132 could appear to be a Java, Dalvik, Lua, Python, or other language virtual machine. A corresponding operating environment 134 would use the built-in threading, processing, and code loading capabilities to load and run code. Adding, removing, or modifying a logical container 132 may or may not also involve adding, removing, or modifying an associated operating environment 134. For ease of explanation below, these operating environments will be described in terms of an embodiment as "Virtual Machines," or "VMs," but this is simply one implementation among the options listed above.

In one or more embodiments, a VM has one or more virtual network interfaces 136. Now the virtual network interface is exposed to the operating environment depends upon the implementation of the operating environment. In an operating environment that mimics a hardware computer, the virtual network interface 136 appears as one or more virtual network interface cards. In an operating environment that appears as an operating system, the virtual network interface 136 appears as a virtual character device or socket. In an operating environment that appears as a language runtime, the virtual network interface appears as a socket, queue, message service, or other appropriate construct. The virtual network interfaces (VNIs) 136 may be associated with a virtual switch (Vswitch) at either the hypervisor or container level. The VNI 136 logically couples the operating environment 134 to the network, and allows the VMs to send and receive network traffic. In one embodiment, the physical network interface card 114 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

Figure 2:
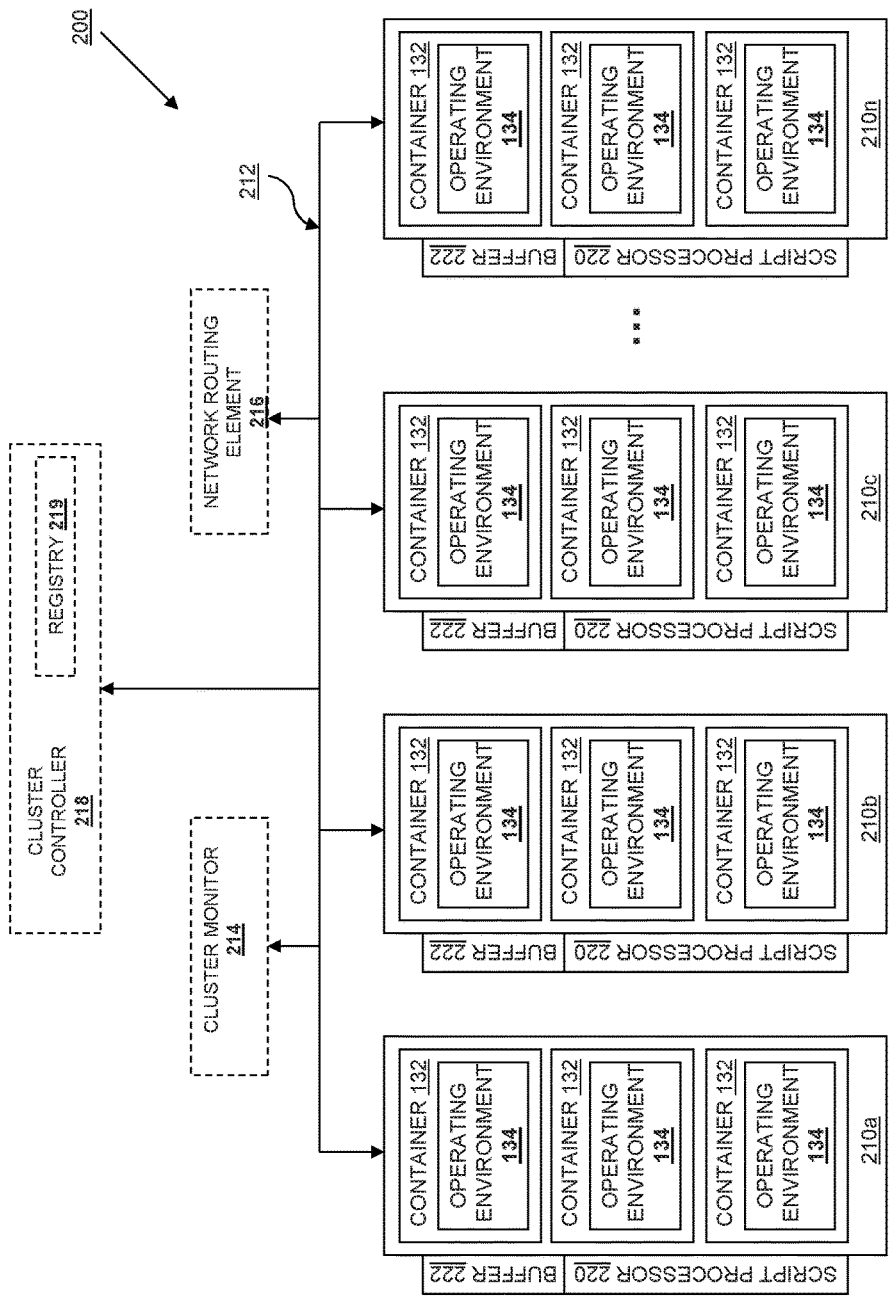
FIG. 2 is a schematic view illustrating an embodiment of a cluster of information processing systems as described in FIG. 1.

Turning now to FIG. 2, a simple network operating environment 200 is shown. The network operating environment 200 includes multiple information processing systems 210*a-n*, each of which correspond to a single information processing system 110 as described relative to FIG. 1, including a hypervisor 130, zero or more logical containers 132 and zero or more operating environments 134. The information processing systems 210*a-n* are connected via a communication medium 212, typically implemented using a known network protocol such as Ethernet, Fibre Channel, Infiniband, or IEEE 1394. For ease of explanation, the network operating environment 200 will be referred to as a "cluster" or "cloud" of operating environments. The cluster may also include a cluster monitor 214 and a network routing element 216. The cluster monitor 214 and network routing element 216 may be implemented as hardware, as software running on hardware, or may be implemented completely as software. In one implementation, one or both of the cluster monitor 214 or network routing element 216 is implemented in a logical container 132 using an operating environment 134 as described above. In another embodiment, one or both of the cluster monitor 214 or network routing element 216 is implemented so that the cluster corresponds to a group of physically co-located information processing systems, such as in a rack, row, or group of physical machines.

The cluster monitor 214 provides an interface to the cluster in general, and provides a single point of contact allowing someone outside the system to query and control any one of the information processing systems 210, the logical containers 132 and the operating environments 134. In one embodiment, the cluster monitor also provides monitoring and reporting capabilities.

The network routing element 216 allows the information processing systems 210, the logical containers 132 and the operating environments 134 to be connected together in a network topology. The illustrated tree topology is only one possible topology; the information processing systems and operating environments can be logically arrayed in a ring, in a star, in a graph, or in multiple logical arrangements through the use of vLANs.

In one embodiment, the cluster also includes a cluster controller 218. The cluster controller is outside the cluster, and is used to store or provide identifying information associated with the different addressable elements in the cluster—specifically the cluster generally (addressable as the cluster monitor 214), the cluster network router (addressable as the network routing element 216), each information processing system 210, and with each information processing system the associated logical containers 132 and operating environments 134.

The cluster controller 218 is outside the cluster, and is used to store or provide identifying information associated with the different addressable elements in the cluster— specifically the cluster generally (addressable as the cluster monitor 214), the cluster network router (addressable as the network routing element 216), each information processing system 210, and with each information processing system the associated logical containers 132 and operating environments 134. In one embodiment, the cluster controller 218 includes a registry of VM information 219. In a second embodiment, the registry 219 is associated with but not included in the cluster controller 218.

In one embodiment, the cluster also includes one or more script processors 220. In the embodiment shown, the script processor is located in the hypervisor, but it is also contemplated to locate a script processor within an active VM or at a cluster level, for example in a piece of machinery associated with a rack or cluster. In one embodiment, the script processor 220 is implemented in a tailored electrical circuit or as software instructions to be used in conjunction with a processor to create a hardware-software combination that implements the specific functionality described herein. To the extent that one embodiment includes computer-executable instructions, those instructions may include software that is stored on a computer-readable medium. Further, one or more embodiments have associated with them a buffer 222. The buffer 222 can take the form of data structures, a memory, a computer-readable medium, or an off-script-processor facility. For example, one embodiment uses a language runtime as a script processor 220. The language runtime can be run directly on top of the hypervisor, as a process in an active operating environment, or can be run from a low-power embedded processor. In a second embodiment, the script processor 220 takes the form of a series of interoperating but discrete components, some or all of which may be implemented as software programs. For example, in this embodiment, an interoperating bash shell, gzip program, an rsync program, and a cryptographic accelerator chip are all components that may be used in a script processor 220. In another embodiment, the script processor 220 is a discrete component, using a small amount of flash and a low power processor, such as a low-power ARM processor. This hardware-based script processor can be embedded on a network interface card, built into the hardware of a rack, or provided as an add-on to the physical chips associated with an information processing system 210. It is expected that in many embodiments, the script processor 220 will have an integrated battery and will be able to spend an extended period of time without drawing current. Various embodiments also contemplate the use of an embedded Linux or Linux-Android environment.

FIGS. 3a-3f show a series of flowcharts detailing the operations involved in waking or instantiating a VM according to one or more embodiments. FIGS. 3-7 will be discussed with reference to the physical and logical infrastructure described relative to FIGS. 1 and 2.

Figure 3A:
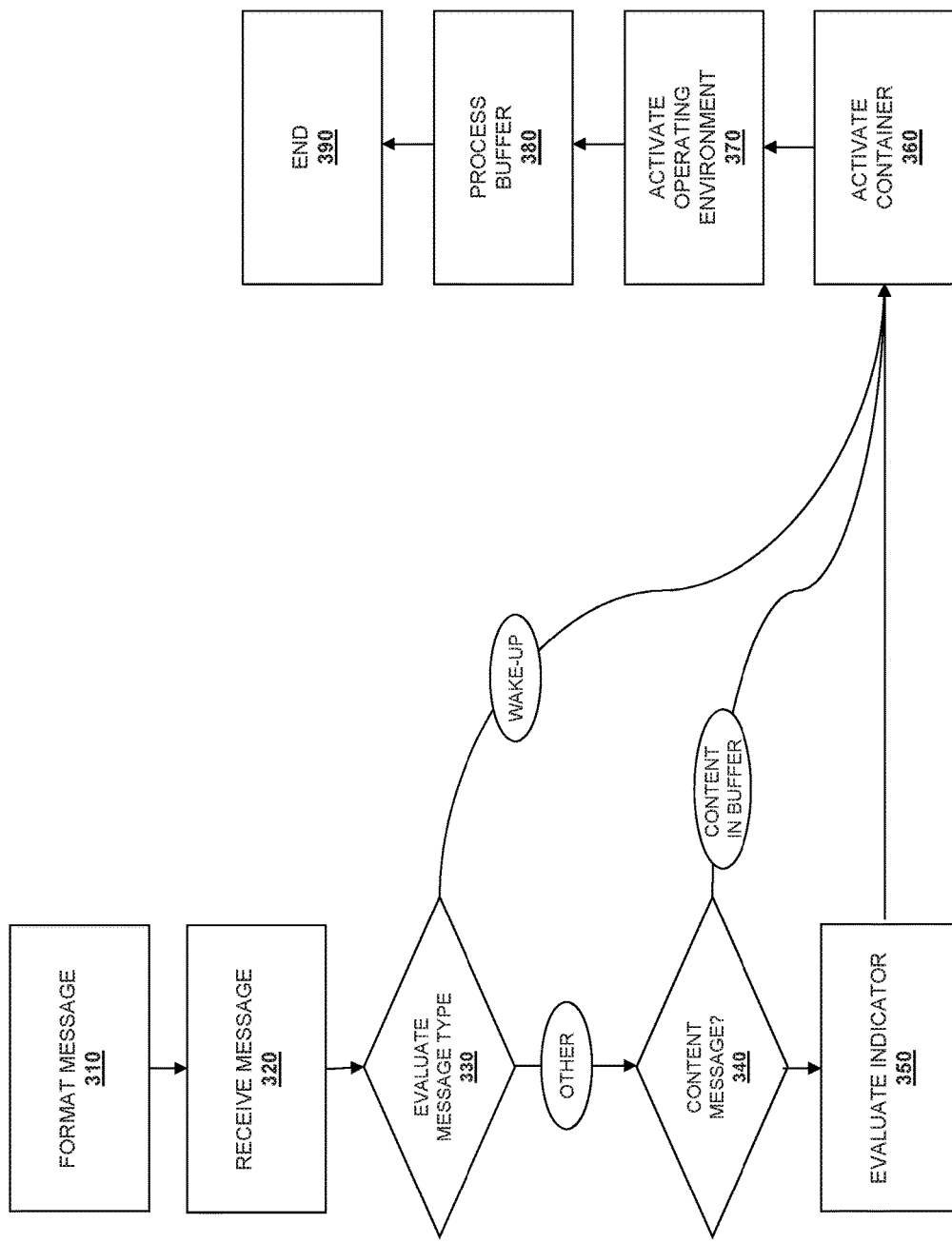
FIG. 3*a* is a flow chart illustrating an embodiment of a method for waking a virtual machine using a wake-up message.

FIG. 3a shows a first embodiment wherein a VM is made available. In this case, the VM has been predefined and preallocated, and is currently in sleep level S4 or S5. The identifying information for this VM is stored within one of the cluster controller 218, the network routing element 216, the cluster monitor 214, a hypervisor 130 or in a non-sleeping operating environment 134. In this embodiment, a suspended VM may be powered on automatically when there is a request destined for that VM. Because the VM already has been provisioned, the identifying information for the VM (the MAC address, IP address, and/or any other unique identifiers) are already known. At step 310, a message is formatted addressing the VM. In a first embodiment, this is a magic packet, or a subnet-directed broadcast. In another embodiment, another message format is used, such as one of the formats described above. At step 320, the network interface card associated with the information processing system 210 hosting the VM receives the message. At step 330, the message is evaluated for whether it is a wakeup-only message, an indicator message, or a content message. If the message is a wakeup-only message, processing moves to step 360. Otherwise, processing moves to step 340. At step 340, a first script processor 220 examines the message. If the message is a content message, then it is put into a buffer 222 and processing moves to step 360. Otherwise, processing moves to step 350. At step 350, the received indicator message is evaluated, any indicated values are retrieved and processed before moving on to step 360. It may occur that one or more values are placed into a buffer 222 for the VM. At step 360, the hypervisor activates the logical container 132 associated with the VM. At step 370, the hypervisor, acting in concert with the activated logical container 132, activates the associated operating environment 134. At step 380, any buffer contents are evaluated, and processed or forwarded on to the operating environment 134. At step 390, the process ends.

Figure 3B:
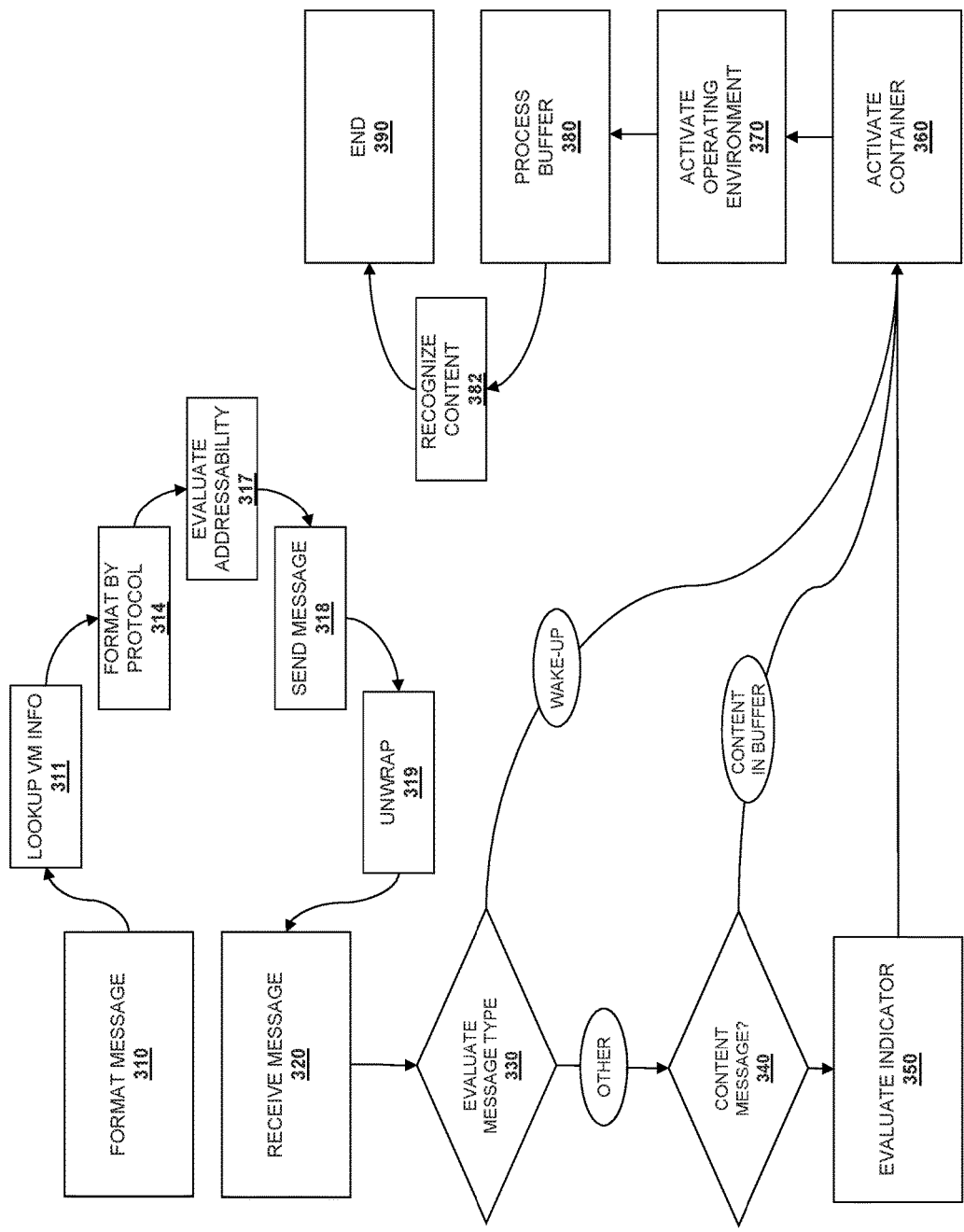
FIG. 3*b* is a flow chart illustrating an embodiment of a method for waking a virtual machine using a content message.

FIG. 3b shows a second embodiment wherein a VM is made available. In this case, the VM has been predefined and preallocated, and is currently in sleep level S4 or S5. Where steps have the same number as in FIG. 3a, they are the same; primary differences are highlighted below. At step 310, a message is formatted addressing the VM. This is done by going to step 311. At step 311, any necessary information regarding the location of the VM is looked up, including the MAC address, the IP address, and/or any unique identifiers associated with the VM, by querying the cluster controller 218 or the registry 219. The process then moves to step 314, where the content message is formatted according to a protocol known in the art. For example, if the message is an HTTP message, it is formatted according to the HTTP standard. An SMTP message is formatted according to the SMTP standard, etc. At step 317, the addressability of the message is evaluated, and an appropriate wrapper is provided if necessary. For example, in a first embodiment in which the message is a WoL packet, it is put into a subnet directed broadcast. In a second embodiment in which the message is a WoL packet, the WoL packet is put into a routable wrapper or tunnel. In a third embodiment, a standard packet addressed to a VM that is not yet capable of responding is placed into a wrapper that addresses the hypervisor, the cluster monitor, or another associated entity that can receive a message. This step may be done repeatedly to wrap the original message several times. At step 318, the message is sent using the communication medium 212. At step 319, the message is received by a receiver and unwrapped if necessary. If further routing is needed, steps 317-319 are repeated as necessary. The process than proceeds until step 380. At step 382, the message is recognized as a content message, and the content message is provided to the VM for appropriate processing and response. The process then goes to step 390 and ends.

FIG. 3c shows a third embodiment wherein a VM is made available. In this case, the VM has been predefined and preallocated, and is currently in sleep level S4 or S5. Where steps have the same number as in FIGS. 3a-3b, the are the same; only the differences are highlighted below. At step 310, a message is formatted addressing the VM. This is done by going to step 311. At step 311, any necessary information regarding the location of the VM is looked up, including the MAC address, the IP address, and/or any unique identifiers associated with the VM, by querying the cluster controller 218 or the registry 219. At step 312, a set of possible indicators is consulted. At step 313, a message is formatted using an indicator that specifies that the VM is to be transitioned to from information processing system 210a to information processing system 210b prior to awakening. In a first embodiment, this is a magic packet, or a subnet-directed broadcast on a non-standard port, such as 12, or using a non-standard EtherType. In another embodiment, another message format is used, such as one of the formats described above. Steps 317-319 are then followed as previously described. At step 320, the network interface card associated with the information processing system 210 hosting the VM receives the message. At step 330, the message is evaluated for whether it is a wakeup-only message, an indicator message, or a content message. If the message is a wakeup-only message, processing moves to step 360. Otherwise, processing moves to step 340. At step 340, a first script processor 220 examines the message. If the message is a content message, then it is put into a buffer 222 and processing moves to step 360. Otherwise, processing moves to step 350. At step 350, the received indicator message is evaluated, any indicated values are retrieved and processed before moving on. In this embodiment, processing moves to step 361, wherein the disk image associated with the VM is transferred via a shared medium or via the network to information processing system 210b. The first script processor 220 then moves to step 310, and generates a wakeup message addressed to the VM as located on the new information processing system 210b. The information processing system 210a then moves to step 390 and ends. Information processing system 210b then proceeds with steps 320-390 as described relative to FIG. 3a and ends.

Figure 3D:
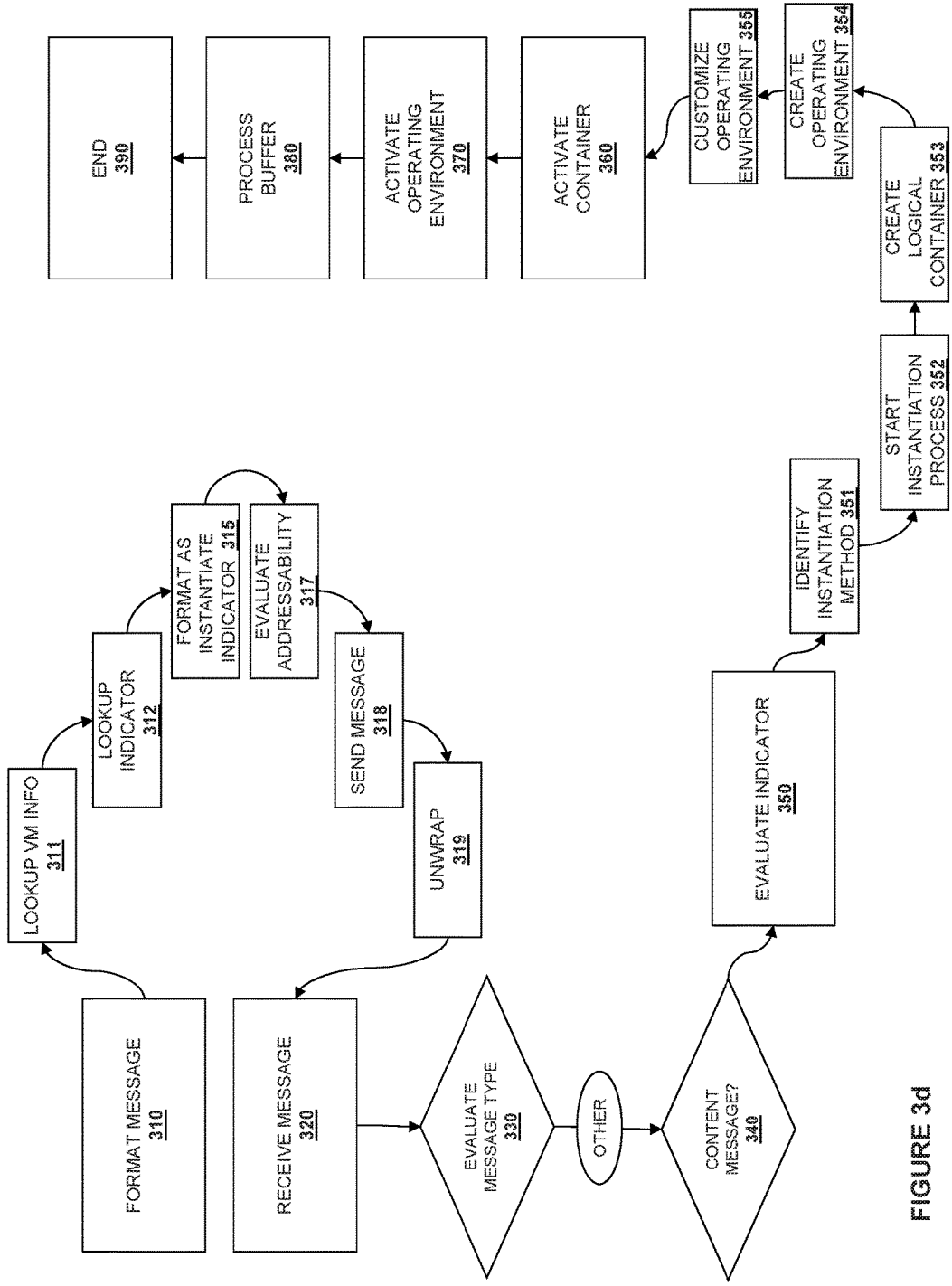
FIG. 3*d* is a flow chart illustrating an embodiment of a method for instantiating a virtual machine using a message.

FIG. 3d shows a fourth embodiment wherein a VM is made available. In this case, the VM has not been predefined and preallocated, and no particularized VM is available but sleeping. Where steps have the same number as in FIGS. 3a-3c, the are the same; only the differences are highlighted below. At step 310, a message is formatted addressing the VM. This is done by going to step 311. At step 311, any necessary information regarding the location of the VM is looked up, including the MAC address, the IP address, and/or any unique identifiers associated with the VM. In this case, many of the identifying aspects of the VM, such as MAC address, IP address, or any other unique identifiers are not known at the VM level. The necessary routing and identification information is therefore generated or retrieved from one of the cluster controller 218 or registry 219. At step 312, a set of possible indicators is consulted. At step 315, a message is formatted using an indicator that specifies that the VM is to be instantiated prior to awakening. In a first embodiment, this is a magic packet, or a subnet-directed broadcast on a non-standard port, such as 13, or using a non-standard EtherType. In another embodiment, another message format is used, such as one of the formats described above. In a further embodiment, the indicator is specialized so as to indicate a particular process or template to use when instantiating the VM. For example, one embodiment has a standardized "object storage" VM, a "compute node" VM, and a "manager VM." By changing the port, the EtherType, or the message content, the type of VM to instantiate is specified. In a second embodiment, one or more script processors 220 has been provided with an instantiation script. By changing the port, the EtherType, or the message content, the specific script to use is specified. In a third embodiment, a custom protocol is used to transfer information about the VM to be instantiated, including necessary identifying information such as the MAC address to use, the IP address to use, or any other identifying information to associate with the new VM. Steps 317-319 are then followed as previously described. At step 320, the network interface card associated with the information processing system 210 hosting the VM receives the message. At step 330, the message is evaluated for whether it is a wakeup-only message, an indicator message, or a content message. In this embodiment, further processing is always required, so the process moves always to step 340. At step 340, a first script processor 220 examines the message. If the message is a content message, then it is put into a buffer 222 and processing moves to step 360. Otherwise, processing moves to step 350. At step 350, the received indicator message is evaluated, any indicated values are retrieved and processed. This is done by moving to step 351. At step 351, the instantiation message is evaluated to determine how the target VM is to be instantiated. As discussed above relative to step 315, this can be done by specifying a script that gets executed to create a VM, by specifying a template image, or some combination. Accordingly, step 351 identifies the correct script, template, and parameter values from packet indications, packet contents, and pre-shared information. At step 352, the instantiation process is started. In an embodiment in which a template is used, the template is loaded, copied, or otherwise made available. In an embodiment in which a script is used, the script is loaded and executed. It is expected that the instantiation process may take one or more parameters. To the extent that these parameters are not already provided, the necessary values can be retrieved via the network. At step 353, a logical container is created using the provided instantiation process. At step 354, an operating environment is created within the logical container using the provided instantiation process. At step 355, the operating environment is customized or configured as necessary, completing the instantiation of the VM. The process then moves to step 360. At step 360, the hypervisor activates the logical container 132 associated with the VM, if the logical container was not already activated during the instantiation process. At step 370, the hypervisor, acting in concert with the activated logical container 132, activates the associated operating environment 134, if the operating environment was not already activated during the instantiation process. At step 380, any buffer contents are evaluated, and processed or forwarded on to the operating environment 134. Note that the instantiation process may be separate from the contents of the message addressed to the VM; for this purpose the message or part of the message may need to stay in the buffer until the VM is available at step 380, when VM processes any necessary messages addressed to it. At step 390, the process ends.

Figure 3E:
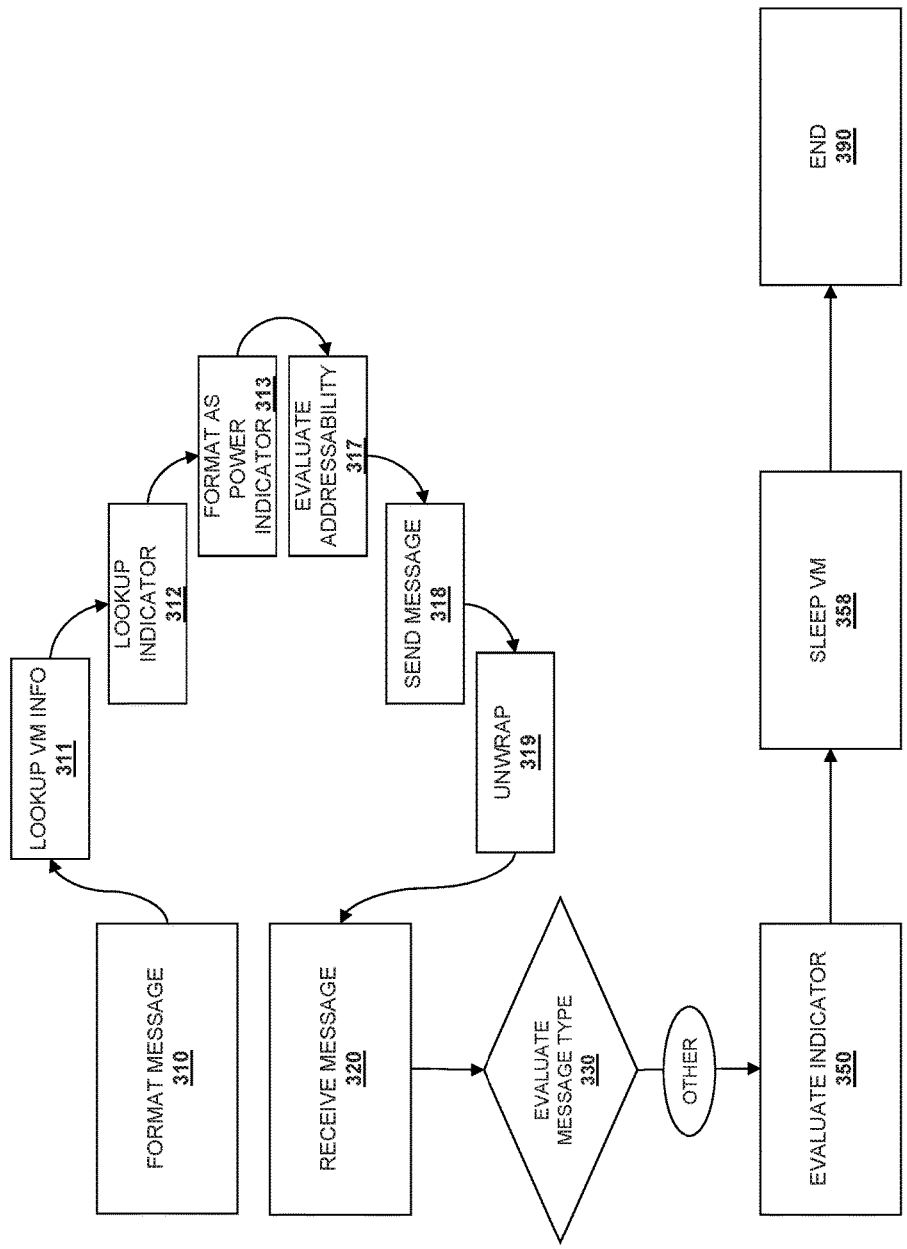
FIG. 3*e* is a flow chart illustrating an embodiment of a method for sleeping a virtual machine using a message.

FIG. 3e shows a fifth embodiment wherein a VM is put to sleep. In this case, the VM is currently active state G0. Where steps have the same number as in FIGS. 3a-3d, the are the same; only the differences are highlighted below. At step 310, a message is formatted addressing the VM. This is done by going to step 311. At step 311, any necessary information regarding the location of the VM is looked up, including the MAC address, the IP address, and/or any unique identifiers associated with the VM, by querying the cluster controller 218 or the registry 219. At step 312, a set of possible indicators is consulted. At step 316, a message is formatted using an indicator that specifies that the VM power state is to be changed. In a first embodiment, this is a magic packet, or a subnet-directed broadcast on a non-standard port, such as 14, or using a non-standard EtherType. In another embodiment, another message format is used, such as one of the formats described above. In a further embodiment, the indicator is specialized so as to indicate a particular power state (such as S4 or S5) to use when changing the power state of the VM. Steps 317-319 are then followed as previously described. At step 320, the network interface card associated with the information processing system 210 hosting the VM receives the message. At step 350, the received indicator message is evaluated, any indicated values are retrieved and processed before moving on to step 360. This is done by moving to step 358, wherein the hypervisor sends the appropriate messages to send a VM into the specified power mode. This embodiment then moves to step 390 and ends.

FIG. 3f shows a sixth embodiment wherein a VM is decommissioned or destroyed. In this case, the VM is in any power state. Where steps have the same number as in FIGS. 3a-3e, the are the same; only the differences are highlighted below. At step 310, a message is formatted addressing the VM. This is done by going to step 311. At step 311, any necessary information regarding the location of the VM is looked up, including the MAC address, the IP address, and/or any unique identifiers associated with the VM, by querying the cluster controller 218 or the registry 219. At step 312, a set of possible indicators is consulted. At step 316, a message is formatted using an indicator that specifies that a specified VM is to be destroyed. Note that this can be a special case of a power state change indicator. In another embodiment, it is a separate indicator. In a first embodiment, this is a magic packet, or a subnet-directed broadcast on a non-standard port, such as 15, or using a non-standard EtherType. In another embodiment, another message format is used, such as one of the formats described above. Steps 317-319 are then followed as previously described. At step 320, the network interface card associated with the information processing system 210 hosting the VM receives the message. At step 350, the received indicator message is evaluated, any indicated values are retrieved and processed before moving on to step 360. This is done by moving to step 359, wherein the hypervisor removes the VM from memory and/or from disk. This embodiment then moves to step 390 and ends.

Note that the described embodiments are elementary operations—instantiate, wake, move, sleep, and destroy. These operations are designed to be composable. For example, in one embodiment, a "move" instruction for a live VM could be formatted as "sleep, move, wake." This move instruction can be associated with a single message, or can also be performed using a sequence of messages.

In one embodiment, one or more script processors 220 can delay the action on a particular message to satisfy prerequisites associated with fulfilling the message. For example, an entire rack of servers may be powered down. In response to a single message sent to a VM associated with that rack, the rack can be powered up, an information processing system 210 can be powered up, a VM instantiated, and the message responded to, at the cost of the latency associated with powering on the necessary equipment and instantiating the VM.

In some embodiments, the combination of auto-instantiation, and sleep at a VM, information processing device, and rack/cluster level allows higher energy savings because entire areas of equipment can be powered down when not in use but dynamically brought up when needed. In another embodiment, the processes described can be used to automatically scale a cluster or cloud computing system both up and down, simply by addressing a system that is desired. If a desired non-existent system is addressed, the cluster transparently brings up the desired system and uses it to respond to the message.

With reference again to FIG. 2, one embodiment of the system for transferring a VM between two hosts with minimal downtime will be described. Two of the information processing systems 210a and 210b will be referred to for explanatory purposes as Host Machine A (information processing system 210a) and Host Machine B (information processing system 210b). The "VM" is a particular operating environment 134 within a particular logical container 132.

Host Machine A contains a VM to be moved to Host Machine B. The VM is running and live on Host Machine A. Preliminarily, Host Machine B is prepared to receive the VM. In Host Machine A takes a snapshot of the VM and starts the process of transferring the primary disk of the snapshot to Host Machine B. A snapshot is the defined as the state of a system at a particular point in time.

In many cases, it may not be necessary to create a new logical container 132 on Host Machine B. If Host Machine B is operating, then an existing or new logical container can be defined as the target for the snapshot. Otherwise, a new logical container can be defined as described below. The configuration of the logical container on host B is based off the original configuration on Host Machine A.

The hypervisor 130 on Host Machine A ("Hypervisor A") has direct access to the disk and memory images of the running VM, and the hypervisor 130 on Host Machine B ("Hypervisor B") has direct access to the disk and memory images on Host Machine B. Accordingly, Hypervisor A can make a snapshot of the disk and memory of the VM while the VM is running and provide access directly to Hypervisor B so that the appropriate data can be transferred. Because the snapshot is a point of time capture from the VM running, the majority of the data can be copied over to host machine two using the communication medium 212. An incremental update from the snapshot of disk and data is then provided from Hypervisor A to Hypervisor B after the initial snapshot is complete.

If necessary, the VM is powered on (brought into a G0 state). Under the control of one of the cluster monitor 214, the network routing element 216, or the cluster controller 218, the location of the active VM is updated from Host Machine A to Host Machine B, and the migration process is complete. If the VM was in a sleep state (S1-S5), been suspended, the VM can be resumed from the memory state giving the appearance that the VM was never shut down and therefore retaining the uptime of the machine. To the user of the VM, the instance will appear to have been online the entire time with a brief period of network loss.

Figure 4A:
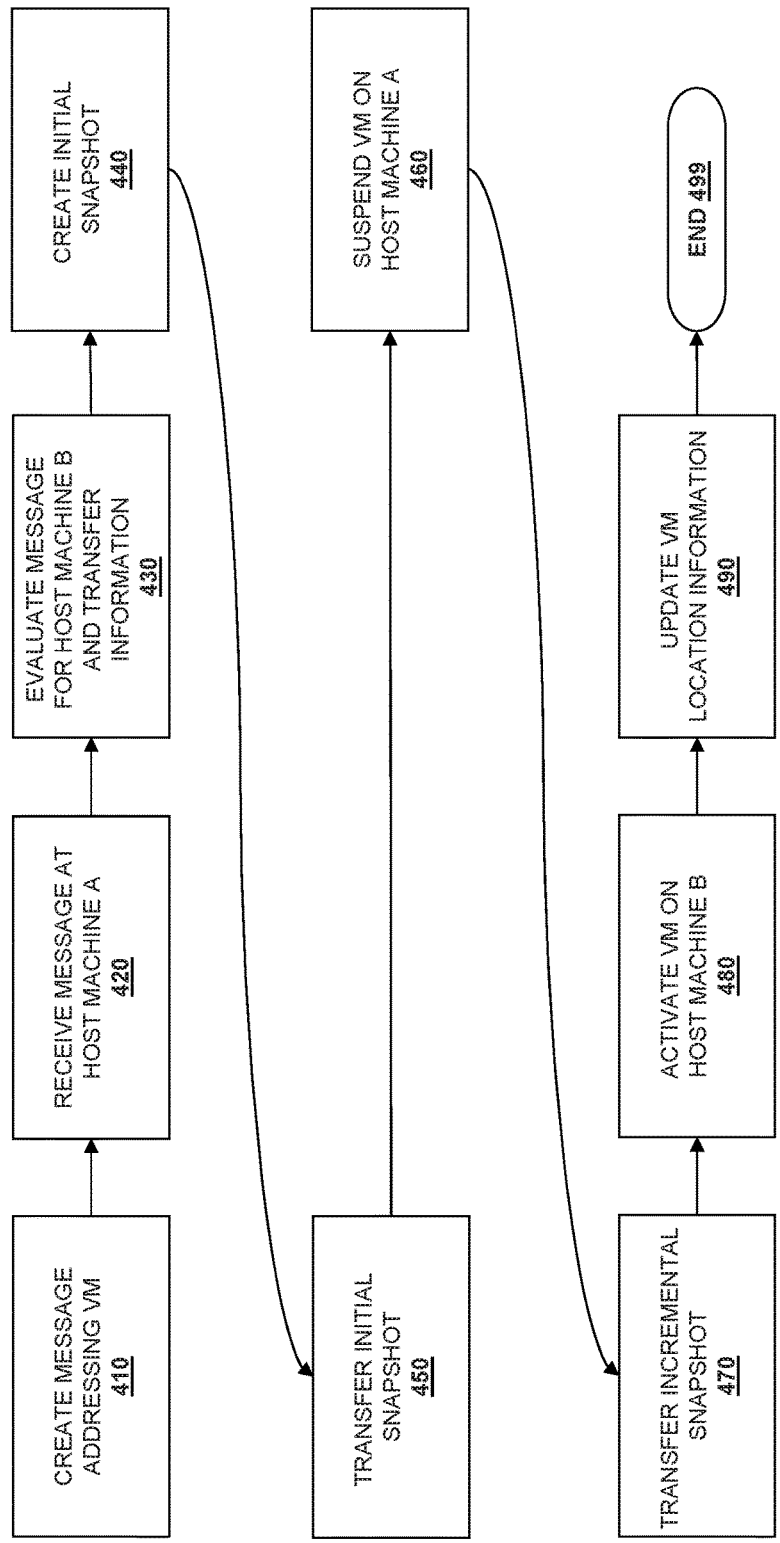
FIG. 4*a* is a flow chart illustrating an embodiment of a method for transferring a virtual machine with minimal downtime.
Figure 4B:
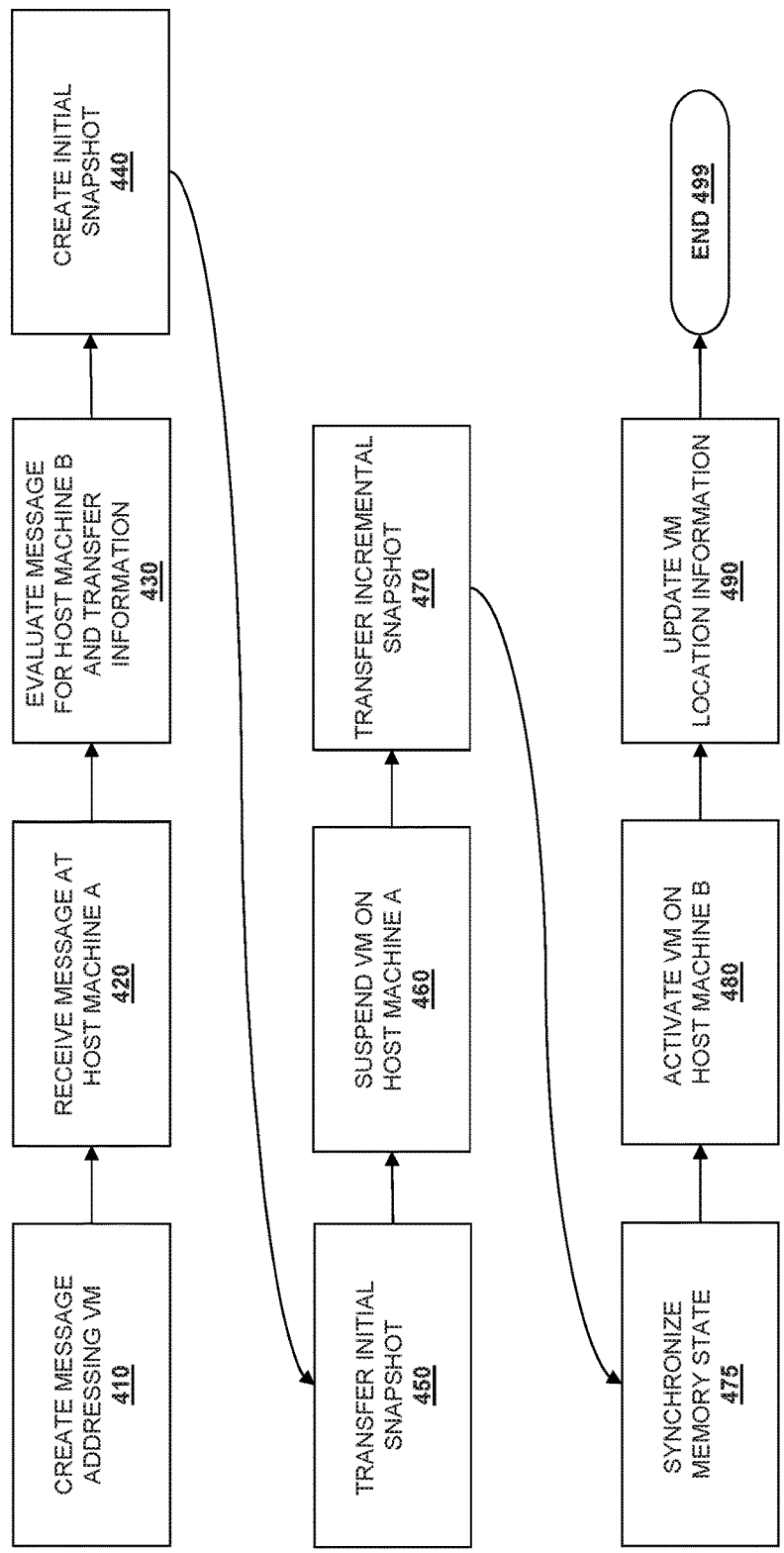
FIG. 4*b* is a flow chart illustrating an embodiment of a method for transferring a virtual machine, including memory synchronization.
Figure 4C:
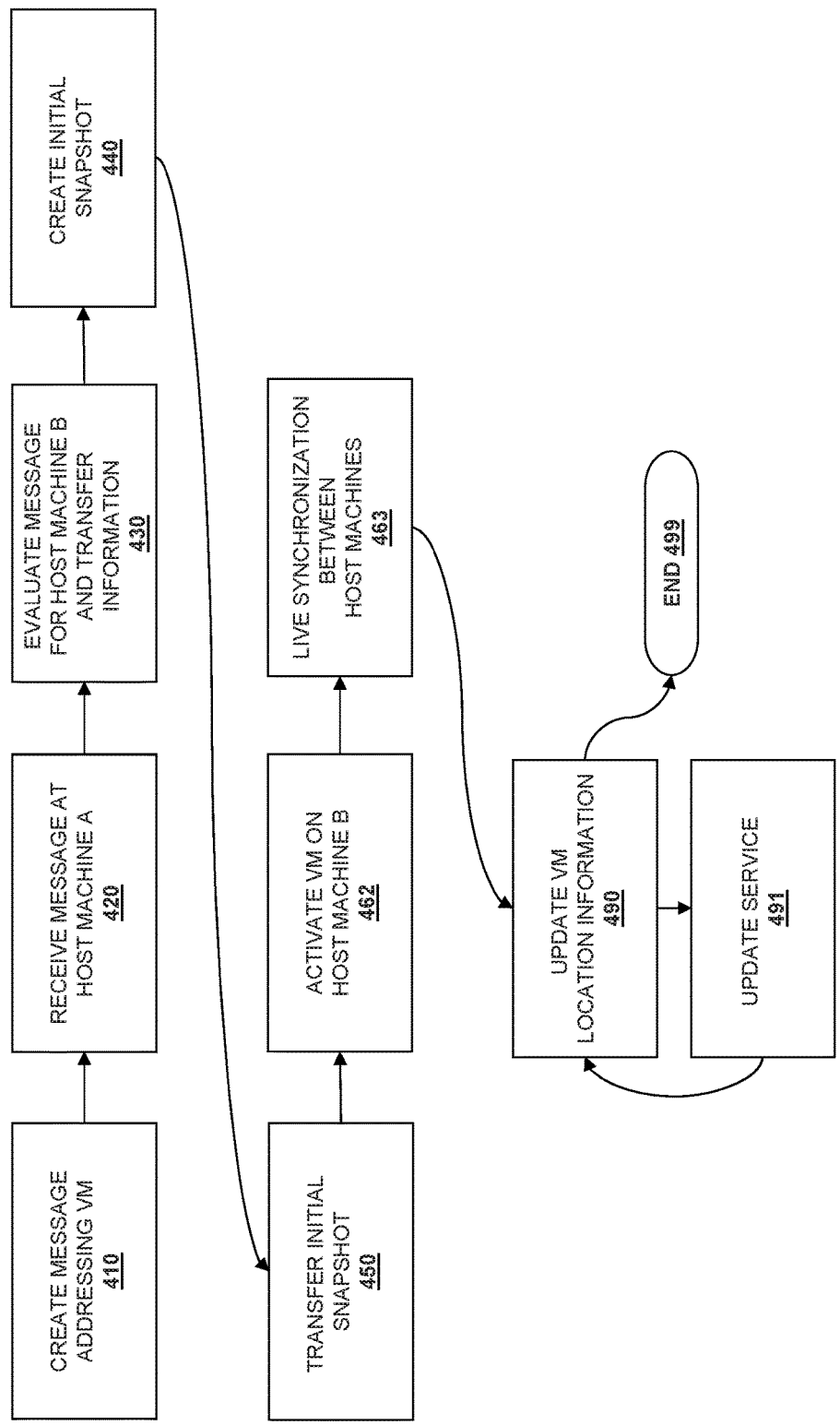
FIG. 4*c* is a flow chart illustrating an embodiment of a method for transferring a virtual machine, including live memory and process migration.

FIGS. 4a-4c show a series of flowcharts detailing the operations showing various embodiments of the snapshot and incremental update procedure.

FIG. 4a shows a first embodiment wherein a VM is migrated from Host Machine A to Host Machine B. In one embodiment, the VM has is currently active (in state G0).

The identifying information for this VM is stored within one of the cluster controller 218, the network routing element 216, the cluster monitor 214, a hypervisor 130 or in a non-sleeping operating environment 134. At step 410, a message is formatted addressing the VM. In a first embodiment, this is a magic packet, or a subnet-directed broadcast. In another embodiment, another message format is used, such as a unicast message, a multicast message, broadcast message, ARP request, or ICMP ping. In other embodiments, the message can be at a higher level in the stack, such as an HTTP request, XMLRPC request, SOAP, CORBA, AMQP or ZeroMQ message, or any other protocol known in the art. This message contains either content or an indicator identifying the destination for the VM. At step 420, the network interface card associated with the Host Machine A receives the message. At step 430, the message is evaluated to determine how to address Host Machine B and the necessary information for the transfer. At step 440, a script processor 220 is used to create an initial snapshot the disk and memory associated with the VM. In one embodiment, this is done by snapshotting a logical volume associated with the VM and a memory image and then mounting them to a directory. If necessary, a script processor 220 is used to prepare Host Machine B, including allocating and configuring a logical container 132. The snapshotting process on Host Machine A and the preparation of Host Machine B can be done by the same script processor, or may be done by multiple script processors in parallel. At step 450, the initial snapshot is transferred from Host Machine A to Host Machine B via the communications medium 212. In one embodiment, the transfer of the initial snapshot is performed using the rsync protocol. In a second embodiment, another protocol such as FTP, TFTP, SFTP, SCP, or HTTP is used. At step 460, the hypervisor on Host Machine A suspends the VM. In one embodiment, the VM is suspended by placing the VM in ACPI power state S4 or S5. At step 470, an incremental snapshot is transferred from Host Machine A to Host Machine B, updating the state of Host Machine B so that it matches the state of Host Machine A. At step 480, the hypervisor on Host Machine B activates the VM. In one embodiment, the activation is performed by placing the VM in power state G0. At step 490, the cluster is updated to reflect the new location of the VM. In one embodiment, updating information within or associated with one of the cluster controller 218, the network routing element 216, the cluster monitor 214, a hypervisor 130 or in a non-sleeping operating environment 134. At step 499, the migration is complete and the process ends.

FIG. 4b shows a second embodiment wherein a VM is migrated from Host Machine A to Host Machine B. Where steps have the same number as in FIG. 4a, they are the same; primary differences are highlighted below. The VM (logical container 132 and operating environment 134) are of any type previously described. In one embodiment, steps 410-450 are performed as described above. At step 460, the hypervisor on Host Machine A suspends the VM. In one embodiment, the VM is suspended by using the hypervisor to stop all processing within the VM; the disk and memory contents are briefly frozen in a consistent state without the VM being aware. At step 470, an incremental snapshot is transferred from Host Machine A to Host Machine B, updating the state of Host Machine B so that it matches the state of Host Machine A. At step 475, the memory state of the VM on Host Machine A is transferred to Host Machine B. At step 480, the hypervisor on Host Machine B activates the VM. In one embodiment, the activation is performed by resuming processing of the VM on Host Machine B from the previously-frozen consistent state. At step 490, the cluster is updated to reflect the new location of the VM. In one embodiment, updating information within or associated with one of the cluster controller 218, the network routing element 216, the cluster monitor 214, a hypervisor 130 or in a non-sleeping operating environment 134. At step 499, the migration is complete and the process ends.

FIG. 4c shows a third embodiment wherein a VM is migrated from Host Machine A to Most Machine B. Where steps have the same number as in FIG. 4a or 4b, they are the same; primary differences are highlighted below. The VM (logical container 132 and operating environment 134) are of any type previously described. In one embodiment, steps 410-450 are performed as described above. Instead of going to step 460, in this embodiment, processing moves to step 462. At step 462, the operating environment 132 on Host Machine B is activated. At step 463, a live synchronization protocol is used to synchronize the changes within the VMs running on Host Machine A and Host Machine B. There are several different embodiments of this functionality, and an embodiment may use one or more of the implementation strategies described below. In a first implementation, this is done by transferring a first incremental snapshot using the live data from Host Machine A to Host Machine B to minimize the changes between the environments at Host Machine A and Host Machine B. In a second implementation, the changes to the state of Host Machine A are logged and the logs provided to Host Machine B. Host Machine B replays the logs to synchronize its state with that of Host Machine A. A third implementation inserts a messaging shim in the operating environment of Host Machine A such that the changes are expressed as a series of messages directed to both Host Machine A and Host Machine B. The changes are executed simultaneously on both host machines. In a fourth implementation, the effective speed of the host machines is lowered so that synchronization can take place more effectively. In a fifth implementation, a NVMA, cache coherency, or snooping protocol is used. For example, the operating environment of Host Machine A could have its effective memory space expanded to include the memory space of Host Machine B, for example by using the virtual memory system to map the virtual memory of Host Machine A to Host Machine B. A sixth implementation could effect live migration of portions of memory by selectively increasing memory pressure on different processes. As those processes are swapped out to memory, they would actually be written to the swap memory of Host Machine B. As those processes are swapped back in, they are swapped back in at Host Machine B and continue executing there. By the end of step 463, the state of Host Machine B matches or is more advanced than the state of Host Machine A. The process then moves to step 490. At step 490 the cluster is updated to reflect the new location of the VM. In one embodiment, this includes updating information within or associated with one of the cluster controller 218, the network routing element 216, the cluster monitor 214, a hypervisor 130 or in a non-sleeping operating environment 134. In an embodiment where the migration occurs process-by-process, step 490 may include one or more iterations of step 491, wherein the information regarding a particular port, service, or process occur selectively to reflect the ongoing live migration. At step 499, the migration is complete and the process ends.

Referring again to FIG. 2, various embodiments of systems and methods to configure the hypervisor 130, or the logical containers 132 or operating environments 134 will now be shown. The hypervisor may also have access to a script processor 220.

Figure 5:
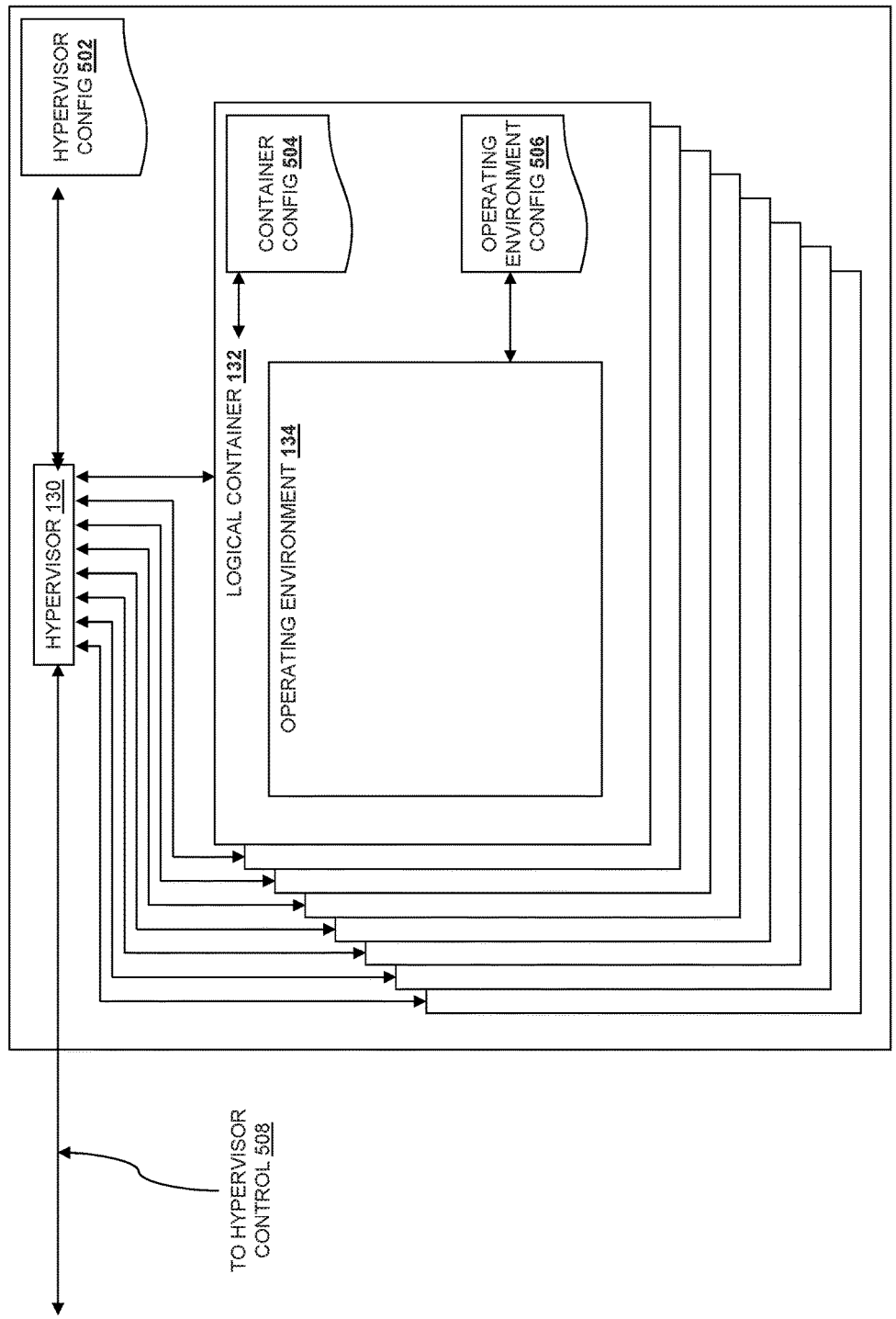
FIG. 5 shows greater detail of a hypervisor according to one embodiment.

FIG. 5 shows part of the hypervisor-logical container interface in greater detail. Hypervisor 130 includes hypervisor-specific configuration options 502. Running on top of the hypervisor are the logical containers 132a-n. Each logical container has a set of associated configuration data, the container configurations 504a-n. In addition, each operating environment 134a-n may also have associated configuration data 506a-n. Finally, hypervisor 130 may have access to a multi-hypervisor configuration mechanism over hypervisor control connection 508.

The hypervisor 130 has hardware and software methods, generally made available through software APIs, which allow it programmatic access to and control of logical containers 132a-n and the associated container configurations 504a-n. This programmatic access and control is shown via the arrows between hypervisor 130, logical containers 132a-n and container configurations 504a-n. Further embodiments also give programmatic control and access to the hypervisor configuration 502, operating environments 134a-n, and operating environment configuration data 506a-n. Finally, this control and access may be provided over the hypervisor control connection 508.

In some circumstances, a logical container 132 and/or an operating environment 134 may not have connectivity or may not support the programmatic access described. Further, the disk and/or memory of the logical container may be encrypted for security purposes. The methods described below allow pre-configuration data related to the virtualization product to be provided at instantiation or configuration time to the hypervisor 130, which is then customized by a script processor 220 to the specific operating environment.

Figure 6:
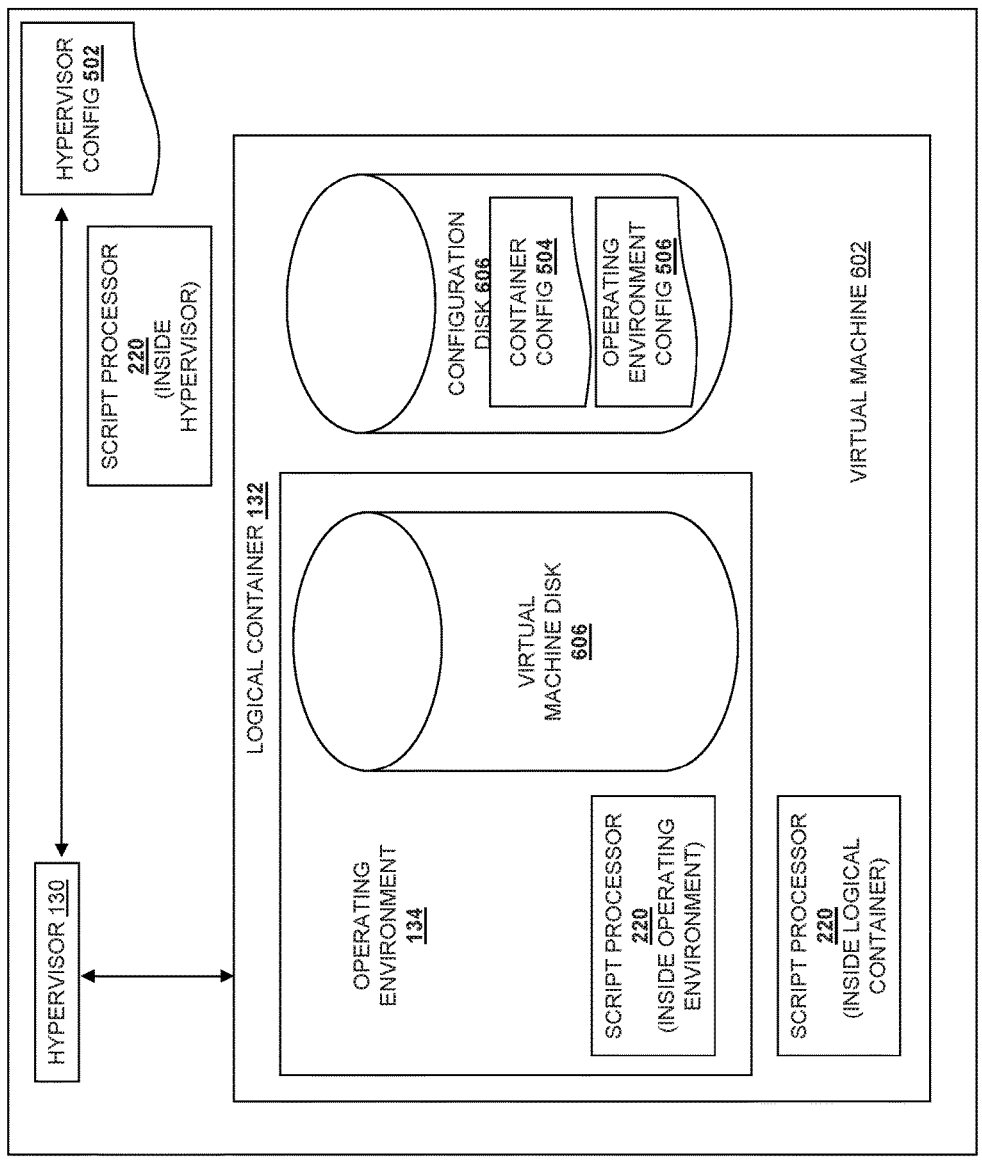
FIG. 6 is a schematic view of a virtual machine-hypervisor interface according to one embodiment.

Referring more specifically to FIG. 6, shown therein is a hypervisor 130 as described above and a single logical container 132 and operating environment 134 (collectively, the "virtual machine 602"). The hypervisor 130 is in communication with a configuration disk 604 and a virtual machine disk 606. One or more script processors 220 are available to the hypervisor 130, the logical container 132, and the operating environment 134. In one embodiment, it is advantageous to place a script processor 220 within the logical container 132 or the operating environment 134 so that programmatic access is available within the security context of the container or operating environment. A script processor 220 within the logical container 132 or operating environment 134 will be said to be running "in" the virtual machine 602. The customized settings of the virtual machine 602 are stored within configuration disk 604. The customized settings include one or more of hypervisor-specific configuration options 502, container configurations 504, or operating environment configurations 506.

Figure 7:
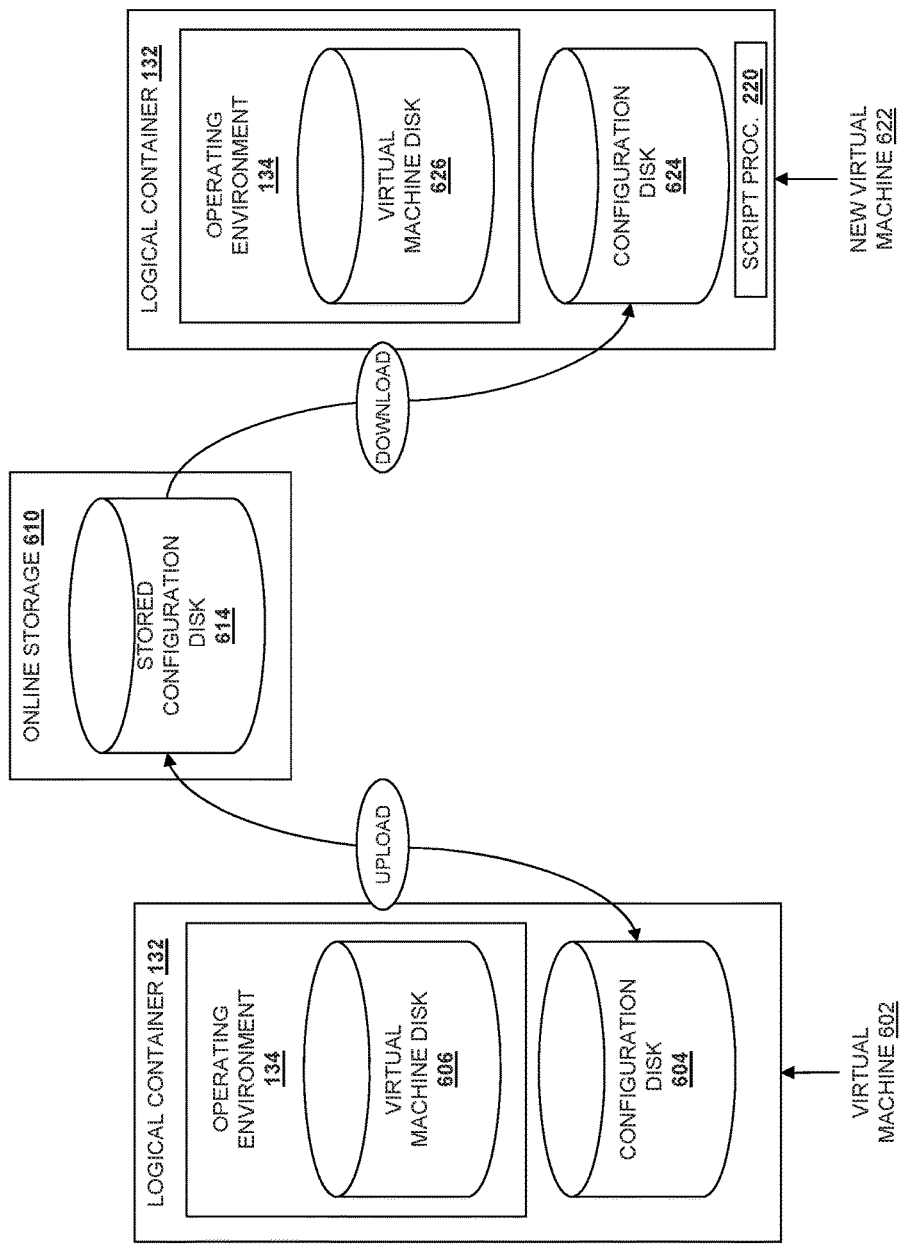
FIG. 7 is a schematic view illustrating communication and storage of a configuration disk.

Referring now to FIG. 7, configuration data corresponding to the configuration disk 604 is uploaded to online storage 610. In one embodiment, online storage 610 is a cloud storage system. In a second embodiment, the online storage is on a different information processing system, perhaps including its own hypervisor 130, logical containers 132 and operating environments 134. When a subsequent virtual machine 622 with virtual machine disk 626 is to be configured with the same setup as virtual machine 602, the configuration information corresponding to the configuration disk 604, now available as stored configuration disk 614, is downloaded from the online storage 610 and added to the new instance.

In one embodiment, an additional disk image (e.g., additional VHD) is delivered along with a basic disk image. The additional disk image includes the configuration information injected by the provisioning system. In some instances, the additional disk image containing the configuration information is 32 mb or 64 mb in size. However, in other instances, the disk image containing the configuration information is smaller or larger in size. The information on the configuration disk 614 is mounted by the virtual machine to become configuration disk 624. The information from configuration disk 624 is utilized by a script processor 220 to configure networking, set administrator access, inject files to a virtual machine disk, and/or otherwise configure the virtualization product in accordance with the configuration information corresponding to the configuration disk 624. In one embodiment, the script processor is running in the virtual machine 622. Generally, the format of the configuration information as stored in the cloud and uploaded to the configuration disk 614 can be any format, it is advantageous to use a file system format that is readable by a majority of modern operating systems.

In some embodiments, the configuration disk 614 of the instance of the virtualization product can be written to by the user. For example, in some instances the user can store additional configuration information about the instance or applications hosted on the instance. In such instances, the configuration disk 614 can be backed up independently of the baseline configuration information initially loaded on the configuration disk. In some instances, the provisioning system overwrites any old instance configuration information such that the user can use the application information to quickly customize the instance. Further, in some embodiments, the modified version of the configuration information can be applied to another instance in a similar manner.

In another embodiment, standard configurations, such as those used for automated creation of instances, can be provisioned or pre-provisioned and made available for use. In such an embodiment, it may be useful to define part of the information on the stored configuration disk 614 in terms of variables or dynamically calculable or retrievable information.

Figure 8:
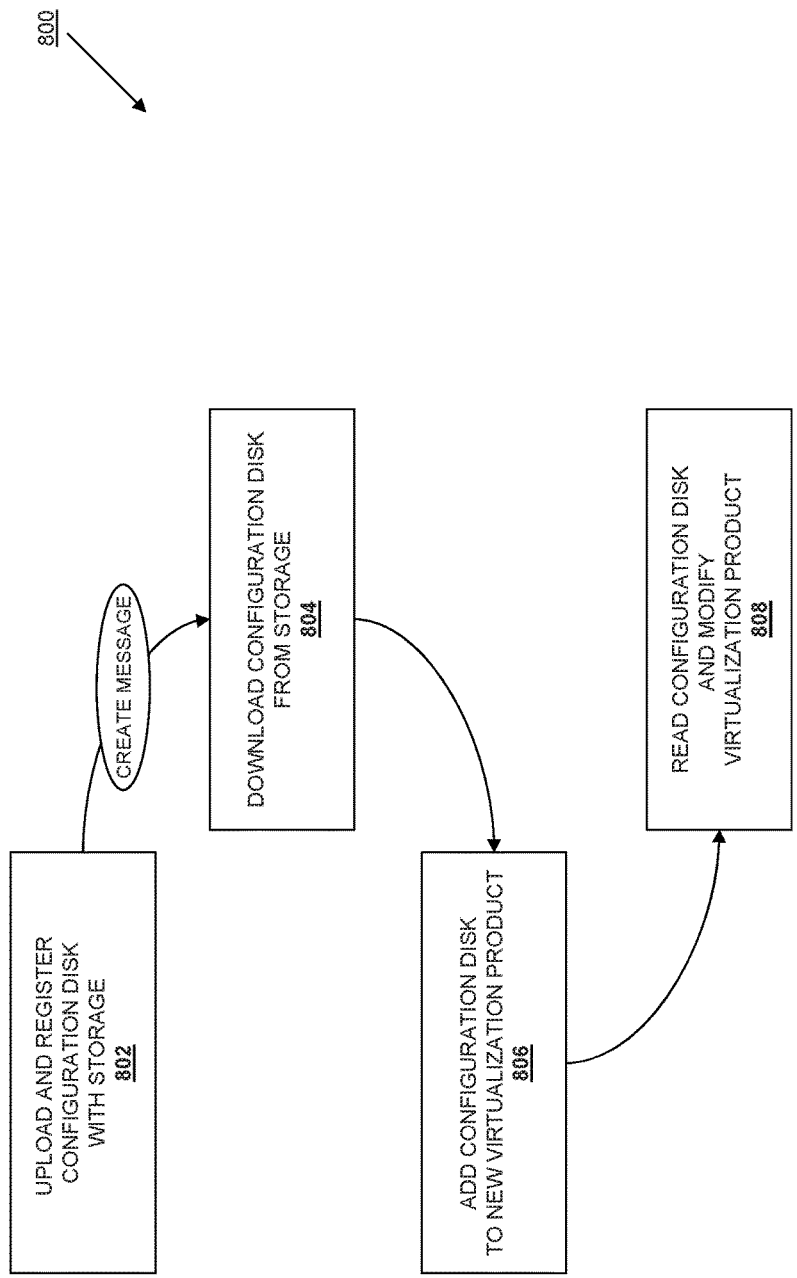
FIG. 8 is a flow chart illustrating aspects of a method according to one embodiment.

Referring now to FIG. 8, shown therein is a flowchart 800 illustrating aspects of the exemplary methods discussed above with respect to FIGS. 5-7. As shown, the flowchart 800 begins at step 802 where the system uploads a configuration disk to cloud storage and registers the configuration disk with a service provider. When a new instance of a virtualization product having the configuration defined by the configuration disk is desired, the system downloads, at step 804, the configuration disk from the cloud storage and adds it to the new instance. At step 806, the system adds the configuration disk to the hypervisor associated with the new instance. At step 808, an script processor 220 associated with the hypervisor reads the configuration disk and modifies the virtualization product of the hypervisor in accordance with the configuration parameters of the configuration disk. Subsequently, the new instance of the virtualization product will run on the hypervisor with the configuration parameters defined by the configuration disk.

A number of alternative embodiments of the configuration method described are contemplated. Although the configurations above are described in terms of disks, it is contemplated that in one embodiment configuration information will be provided through a readable socket. In a second embodiment, configuration information will be provided through a memory-mapped area. In a third embodiment, configuration information will be provided through a configuration data structure that is available to script processor 220. In another embodiment, the configuration information is provided as an "overlay" over the raw information. For example, one implementation uses a RAM, flash, or disk-backed live overlay or union filesystem over another, more generic filesystem. The generic filesystem can be stored or accessed as a read-only filesystem, enhancing security and maintainability. In another embodiment, the overlay takes the form of the shadowing of variables, settings, or other information available to the VM.

Although the method operations were described in a specific order, it should be understood that other operations may be performed in between the described operations, or operations may be adjusted so that they occur at slightly different times, or may be distributed in a system which allows the occurrence of the processing operations at various intervals associated with the processing, as long as the processing of the overlay operations are performed in the desired way.

In though illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for computation, the system comprising:
a combination hardware/software platform, the hardware portion of the platform including a first network interface card (NIC), a processor, a memory, a computer-readable storage medium, and a power controller; the software portion of the platform including a hypervisor, associated with a plurality of logical containers, each logical container including a virtual interface,
wherein each logical container is operable to host an operating environment;
wherein each logical container and each operating environment can be in one of a plurality of states, including an active state, an inactive state, and an unallocated state; and wherein the hypervisor, the logical containers, and the operating environments can be manipulated by a sequence of computer-readable instructions;
wherein, responsive to a first message received at the first NIC, the first message identifying a first virtual interface associated with a first operating environment, the platform is operable to determine a message type of the first message and evaluate whether the identified first operating environment is active; and take action thereon, wherein when the message type indicates that the identified first operating environment should be in an inactive state, using the processor to execute a sequence of computer-readable instructions that, when executed, when the first operating environment is active, place the first operating environment into the inactive state; and
wherein, responsive to a second message received at the first NIC, the second message identifying the first virtual interface associated with the first operating environment, the platform is operable to determine a message type of the second message and evaluate whether the identified first operating environment is in the inactive state; and take action thereon, wherein when the message type indicates the first operating environment should be transferred from a first information processing system (IPS) to a second IPS on the platform, using the processor to execute a sequence of computer-readable instructions that, when executed, when the first operating environment is in the inactive state, transfer the first operating environment from the first IPS to the second IPS.

2. The system of claim 1, wherein the hardware portion of the platform can be in one of a plurality of states including an active state and a low power state;
wherein the power controller is operable to change the state of the hardware portion of the platform; and
wherein the computer-readable instructions further comprise instructions that, when executed:
after placing the first operating environment into an inactive state, determine whether a second operating environment machine is active on the platform; and
when the second operating environment is not active, place the hardware portion of the platform into a low power state.

3. The system of claim 1 wherein the first and second messages use a MAC address to identify the first virtual interface.

4. The system of claim 1, wherein the first and second messages use an interne protocol address to identify the first virtual interface.

5. The system of claim 1 wherein the first and second messages are sent using the Ethernet protocol.

6. The system of claim 1, wherein the first message further identifies a particular power state, and wherein placing the first operating environment into the inactive state includes placing the first operating environment into the inactive state indicated by the particular power state.

7. The system of claim 1, wherein placing the first operating environment into the inactive state includes transmitting, by the hypervisor, a plurality of messages to the first operating environment to place the first operating environment into the inactive state.

8. A method for remotely managing a hardware/software platform, the method comprising:
receiving, at a first location, using a network interface card (NIC) associated with a hardware portion of a hardware/software platform, a management packet identifying a first virtual machine associable with the platform, the virtual machine including a logical container and an operating environment;
evaluating said management packet via an instruction processor executing on said platform to determine a message type; and
when the message type is a power indicator message, then:
when the first virtual machine is active, identifying first instruction sequence from the management packet, the first instruction sequence suitable for placing the first virtual machine into an inactive state, and executing the first instruction sequence to place the first virtual machine into the inactive state; and
when the first virtual machine is not active, identifying a second instruction sequence from the management packet, the second instruction sequence suitable for transferring the first virtual machine from a first information processing system (IPS) to a second IPS on the platform; and executing the second instruction sequence to transfer the first virtual machine from the first IPS to the second IPS.

9. The method of claim 8, further comprising the steps of:
after placing the first virtual machine into the inactive state; determining whether a second virtual machine is active on the same hardware portion of the platform; and when the second virtual machine is not active, placing the hardware portion of the platform into a lower power state.

10. The method of claim 8 wherein the management packet uses a MAC address to identify the first virtual interface.

11. The method of claim 8, wherein the management packet uses an internet protocol address to identify the first virtual interface.

12. The method of claim 8 wherein the management packet is sent using the Ethernet protocol.

13. The method of claim 8, wherein the first instruction sequence from the management packet further identifies a particular power state, and wherein placing the first operating environment into the inactive state includes placing the first operating environment into the inactive state indicated by the particular power state.

14. The method of claim 8, wherein placing the first operating environment into the inactive state includes transmitting, by the hypervisor, a plurality of messages to the first operating environment to place the first operating environment into the inactive state.

15. A system for computation, the system comprising:
a combination hardware/software platform, the hardware portion of the platform including a first network interface card (NIC), a processor, a memory, a computer-readable storage medium, and a power controller; the software portion of the platform including a hypervisor associated with a plurality of logical containers, each logical container including a virtual interface;
wherein each logical container is operable to host an operating environment;
wherein each logical container and each operating environment can be in one of a plurality of states, including at least an active state and an inactive state; and wherein the hypervisor, the logical containers, and the operating environments can be manipulated by a sequence of computer-readable instructions; and
wherein, responsive to a first message received at the first NIC, the first message identifying a first virtual interface associated with a first operating environment, the platform is operable to determine a message type of the first message and evaluate whether the identified first operating environment is active; and take action thereon, wherein, when the message type indicates that the state of the identified first operating environment should be modified, using the processor to execute a sequence of computer-readable instructions that, when executed, when the first operating environment is active, modify the state of the identified first operating environment to a state indicated by the content of the message; and
wherein, responsive to a second message received at the first NIC, the second message identifying the first virtual interface associated with the first operating environment, the platform is operable to determine a message type of the second message and evaluate whether the identified first operating environment is in the inactive state; and take action thereon, wherein when the message type indicates the first operating environment should be transferred from a first information processing system (IPS) to a second IPS in the platform, using the processor to execute a sequence of computer-readable instructions that, when executed, when the first operating environment is in the inactive state, transfer the first operating environment from the first IPS to the second IPS.

16. The system of claim 15, wherein the hardware portion of the platform can be in one of a plurality of power states, wherein the power controller is operable to change the state of the hardware portion of the platform; and wherein the computer-readable instructions further comprise instructions that, when executed:
after modifying the state of the identified first operating environment into an inactive state, determine whether a second operating environment machine is active on the platform; and
when the second operating environment is not active, place the hardware portion of the platform into a low power state.

17. The system of claim 15 wherein the first and second messages use a MAC address to identify the first virtual interface.

18. The system of claim 15, wherein the first and second messages uses an internet protocol address to identify the first virtual interface.

19. The system of claim 15, wherein the software portion further comprises one or more script processors, and wherein the computer-readable instructions further comprise instructions that, when executed, delay modification of the state of the identified first operating environment to satisfy prerequisites associated with the first message received at the first NIC.

20. The system of claim 15, wherein the inactive state is one of a standby state, hibernation state, and soft off state.

* * * * *